(12) United States Patent
Prichard et al.

(10) Patent No.: US 7,625,157 B2
(45) Date of Patent: Dec. 1, 2009

(54) MILLING CUTTER AND MILLING INSERT WITH COOLANT DELIVERY

(75) Inventors: Paul D. Prichard, Greensburg, PA (US); Linn R. Andras, Ligonier, PA (US)

(73) Assignee: Kennametal Inc., Latrobe, PA (US)

( * ) Notice: Subject to any disclaimer, the term of this patent is extended or adjusted under 35 U.S.C. 154(b) by 313 days.

(21) Appl. No.: 11/654,877

(22) Filed: Jan. 18, 2007

(65) Prior Publication Data

US 2008/0175677 A1   Jul. 24, 2008

(51) Int. Cl.
*B23C 1/00* (2006.01)
*B23C 5/00* (2006.01)

(52) U.S. Cl. ........................................ 407/113; 407/66

(58) Field of Classification Search ............... 407/48, 407/40, 53, 103, 33, 34, 64, 66, 67, 6, 35, 407/70, 113–116, 11
See application file for complete search history.

(56) References Cited

U.S. PATENT DOCUMENTS

| | | | |
|---|---|---|---|
| 2,870,523 | A | 1/1959 | Richard |
| 3,077,802 | A | 2/1963 | Philip |
| 3,323,195 | A | 6/1967 | Vanderjagt |
| 3,429,700 | A | 2/1969 | Wiegand et al. |
| 3,486,378 | A | 12/1969 | Carlson |
| 3,571,877 | A | 3/1971 | Zerkle |
| 3,889,520 | A * | 6/1975 | Stoferle et al. ............... 73/37.5 |
| 3,971,114 | A | 7/1976 | Dudley |
| 4,012,061 | A | 3/1977 | Olson |
| 4,123,194 | A | 10/1978 | Cave |

(Continued)

FOREIGN PATENT DOCUMENTS

DE    30 04 166 C2    2/1980

(Continued)

OTHER PUBLICATIONS

A.S.T.E. Tool Engineers Handbook, McGraw Hill Book Co., New York, New York USA (1949) pp. 302-315.

(Continued)

*Primary Examiner*—Willmon Fridie
(74) *Attorney, Agent, or Firm*—Larry R. Meenan

(57) ABSTRACT

A cutting insert assembly for use in chipforming and material removal wherein the cutting insert assembly is received in a pocket of a cutter body wherein coolant can flow out of a pocket opening contained in the pocket. The cutting insert assembly includes a cutting insert body that presents at least two discrete cutting locations. The cutting insert body contains a coolant entry passage aligned with the pocket opening for coolant to flow through the coolant entry passage. The cutting insert body has a rake surface that contains at least two of the discrete depressions wherein each one of the discrete depressions corresponds to one of the cutting locations. Each one of the discrete depressions extends toward its corresponding cutting location. The assembly includes a diverter that is positioned adjacent to the cutting insert body wherein the diverter has a receiving opening aligned with the coolant entry passage to receive coolant through the coolant entry passage. The diverter includes a coolant trough in communication with the receiving opening wherein the coolant trough is aligned toward a selected one of the cutting locations whereby the coolant trough and the discrete depression corresponding to the selected cutting location define a conduit for the flow of coolant toward the selected cutting location.

40 Claims, 20 Drawing Sheets

U.S. PATENT DOCUMENTS

| | | | |
|---|---|---|---|
| 4,204,787 A | 5/1980 | McCray et al. | |
| 4,276,085 A | 6/1981 | Wisell | |
| 4,437,800 A | 3/1984 | Araki et al. | |
| 4,535,216 A | 8/1985 | Cassidenti | |
| 4,682,916 A | 7/1987 | Briese | |
| 4,813,831 A | 3/1989 | Reinauer | |
| 4,861,203 A | 8/1989 | Bassett et al. | |
| 4,880,461 A | 11/1989 | Lichida | |
| 4,880,755 A | 11/1989 | Mehrotra | |
| 4,881,431 A | 11/1989 | Bieneck | |
| 4,955,264 A | 9/1990 | Armbrust | |
| 5,024,976 A | 6/1991 | Mehrotra et al. | |
| 5,163,790 A | 11/1992 | Vig | |
| RE34,180 E | 2/1993 | Nemeth et al. | |
| 5,222,843 A * | 6/1993 | Katbi et al. | 407/114 |
| 5,237,894 A | 8/1993 | Lindeke | |
| 5,252,119 A | 10/1993 | Nishida et al. | |
| 5,265,985 A * | 11/1993 | Boppana et al. | 407/114 |
| 5,275,633 A | 1/1994 | Johansson et al. | |
| 5,316,323 A | 5/1994 | Jovanovic | |
| 5,333,520 A | 8/1994 | Fischer et al. | |
| 5,346,335 A | 9/1994 | Harpaz et al. | |
| 5,439,327 A | 8/1995 | Wertheim | |
| 5,516,242 A | 5/1996 | Andronica | |
| 5,525,134 A | 6/1996 | Mehrotra | |
| 5,542,792 A | 8/1996 | Krueger et al. | |
| 5,554,338 A | 9/1996 | Sugihara et al. | |
| 5,565,156 A | 10/1996 | Ingelstrom | |
| 5,707,185 A | 1/1998 | Mizutani | |
| 5,718,156 A | 2/1998 | Lagrolet et al. | |
| 5,733,075 A | 3/1998 | Basteck | |
| 5,775,854 A | 7/1998 | Wertheim | |
| 5,816,753 A | 10/1998 | Hall | |
| 5,826,469 A | 10/1998 | Haradem | |
| 5,901,623 A * | 5/1999 | Hong | 82/50 |
| 5,955,186 A | 9/1999 | Grab | |
| 5,975,817 A | 11/1999 | Komine | |
| 6,010,283 A | 1/2000 | Heinrich et al. | |
| 6,045,300 A | 4/2000 | Antoun | |
| 6,050,756 A | 4/2000 | Bucholz et al. | |
| 6,053,669 A | 4/2000 | Lagerberg | |
| 6,056,486 A | 5/2000 | Colvin | |
| 6,117,533 A | 9/2000 | Inspektor | |
| 6,124,040 A | 9/2000 | Kolaska et al. | |
| 6,164,169 A | 12/2000 | Goff | |
| 6,287,682 B1 | 9/2001 | Grab et al. | |
| 6,299,388 B1 | 10/2001 | Slabe | |
| 6,312,199 B1 | 11/2001 | Sjoden et al. | |
| 6,322,746 B1 | 11/2001 | LaSalle et al. | |
| 6,350,510 B1 | 2/2002 | Konig et al. | |
| 6,394,709 B1 | 5/2002 | Sjoo et al. | |
| 6,443,672 B1 | 9/2002 | Lagerberg | |
| 6,447,218 B1 * | 9/2002 | Lagerberg | 407/114 |
| 6,447,890 B1 | 9/2002 | Leverenz et al. | |
| 6,450,738 B1 * | 9/2002 | Ripley | 407/35 |
| 6,471,448 B1 | 10/2002 | Lagerberg | |
| 6,521,349 B1 | 2/2003 | Konig et al. | |
| 6,528,171 B1 | 3/2003 | Endler et al. | |
| 6,551,551 B1 | 4/2003 | Gegel et al. | |
| 6,575,672 B1 | 6/2003 | Maier | |
| 6,595,727 B2 * | 7/2003 | Arvidsson | 407/35 |
| 6,634,835 B1 | 10/2003 | Smith | |
| 6,637,984 B2 * | 10/2003 | Murakawa et al. | 407/11 |
| 6,648,565 B2 | 11/2003 | Schweizer | |
| 6,652,200 B2 | 11/2003 | Kraemer | |
| 6,705,805 B2 | 3/2004 | Lagerberg | |
| 6,708,590 B2 | 3/2004 | Lagerberg | |
| 6,769,335 B2 | 8/2004 | Kaminski | |
| 6,860,172 B2 | 3/2005 | Hecht | |
| 6,884,499 B2 | 4/2005 | Penich et al. | |
| 6,905,992 B2 | 6/2005 | Mehrotra | |
| 6,913,428 B2 | 7/2005 | Kress et al. | |
| 6,957,933 B2 * | 10/2005 | Pachao-Morbitzer et al. | 407/11 |
| 6,998,173 B2 | 2/2006 | Lui et al. | |
| 7,094,717 B2 | 8/2006 | Yeckley | |
| 7,125,205 B2 | 10/2006 | Sheffler | |
| 7,125,207 B2 | 10/2006 | Craig et al. | |
| 7,160,062 B2 | 1/2007 | Tran | |
| 7,252,024 B2 | 8/2007 | Zurecki et al. | |
| 7,273,331 B2 | 9/2007 | Giannetti | |
| 7,309,466 B2 | 12/2007 | Heinrich et al. | |
| 7,510,352 B2 | 3/2009 | Craig et al. | |
| 2002/0106250 A1 | 8/2002 | Murakawa et al. | |
| 2003/0017014 A1 | 1/2003 | Morgulis et al. | |
| 2003/0082018 A1 | 5/2003 | Kraemer | |
| 2003/0095841 A1 | 5/2003 | Kraemer | |
| 2004/0240949 A1 | 12/2004 | Pachao-Morbitzer et al. | |
| 2005/0186039 A1 | 8/2005 | Muller et al. | |
| 2006/0140728 A1 | 6/2006 | Giannetti | |
| 2006/0171837 A1 | 8/2006 | Heinrich et al. | |
| 2006/0263153 A1 | 11/2006 | Isaksson | |
| 2008/0175676 A1 | 7/2008 | Prichard | |
| 2008/0175678 A1 | 7/2008 | Prichard | |

FOREIGN PATENT DOCUMENTS

| | | |
|---|---|---|
| DE | 34 29 842 A1 | 2/1986 |
| DE | 37 40 814 A1 | 12/1987 |
| EP | 100376 A2 | 2/1984 |
| EP | 0 932 460 B1 | 6/2003 |
| FR | 2 244 590 | 9/1973 |
| JP | 60127904 A | 7/1985 |
| JP | 06-083205 U | 11/1994 |
| JP | 08-025111 A | 1/1996 |
| JP | 08039387 A | 2/1996 |
| JP | 09262706 A | 10/1997 |
| JP | 2000280106 A | 10/2000 |
| JP | 2001-113408 A | 4/2001 |
| JP | 2001-239420 A | 9/2001 |
| JP | 2003-053622 A | 2/2003 |
| JP | 06-136953 A | 6/2006 |
| KR | 10-2006-0027154 A | 3/2006 |
| KR | 10-2006-0054916 A | 5/2006 |
| WO | 00/76697 A2 | 12/2000 |
| WO | 2001-58632 A1 | 8/2001 |

OTHER PUBLICATIONS

Moltrecht K.H. Machine Shop Practice [Industrial Press Inc., New York, New York, USA (1981) pp. 199-204.

Santhanam et al. "Cemented Carbides" Metals Handbook, vol. 2, 10th Edition, Properties and Selection, ASM International (1990) pp. 950-977.

Wertheim et al. "Influence of High-Pressure Flushing through the Rake Face of the Cutting Tool", Annals of the CIRP, vol. 41/1 (1992) pp. 101-106.

* cited by examiner

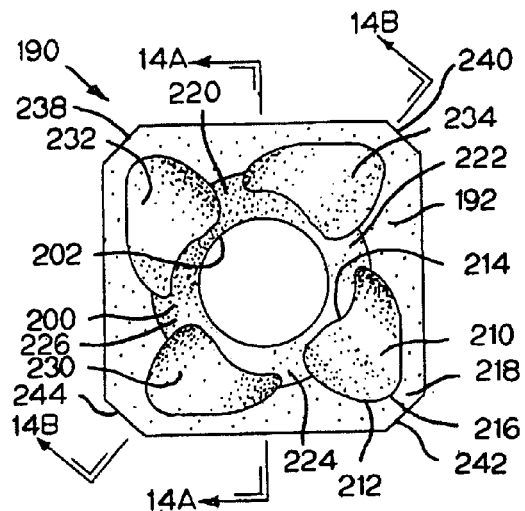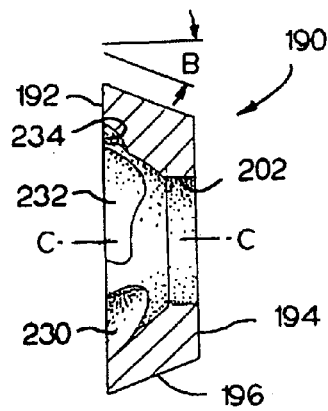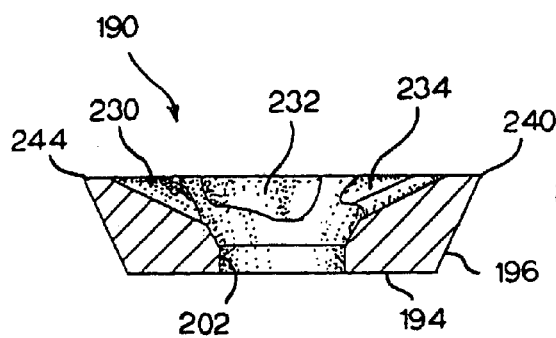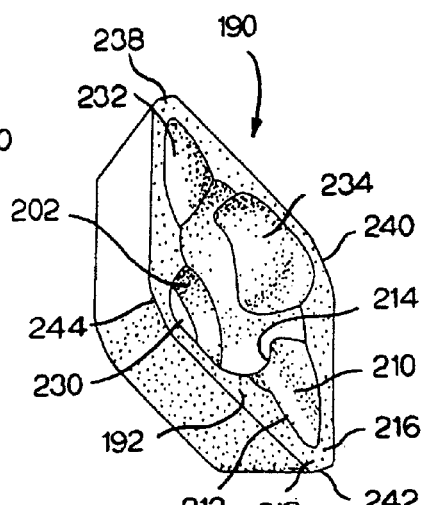
FIG.14
FIG.14A
FIG.14B
FIG.14C

MILLING CUTTER AND MILLING INSERT WITH COOLANT DELIVERY

BACKGROUND OF THE INVENTION

The invention relates to a milling cutter, as well as a milling insert, used for chipforming and material removal operations. More specifically, the invention pertains to a milling cutter, as well as a milling insert, used for chipforming and material removal operations wherein there is enhanced delivery of coolant adjacent the interface between the milling insert and the workpiece (i.e., the insert-chip interface) to diminish excessive heat at the insert-chip interface.

In a chipforming and material removal operation (e.g., a milling operation), heat is generated at the interface between the cutting insert and the location where the chip is removed from the workpiece (i.e., the insert-chip interface). It is well known that excessive heat at the insert-chip interface can negatively impact upon (i.e., reduce or shorten) the useful tool life of the milling insert. As can be appreciated, a shorter useful tool life increases operating costs and decreases overall production efficiency. Hence, there are readily apparent advantages connected with decreasing the heat at the insert-chip interface.

In this regard, U.S. Pat. No. 6,053,669 to Lagerberg discusses the importance of reducing the heat at the insert-chip interface. More specifically, Lagerberg mentions that when the cutting insert is made from cemented carbide reaches a certain temperature, its resistance to plastic deformation decreases. A decrease in plastic deformation resistance increases the risk for breakage of the cutting insert. U.S. Pat. No. 5,775,854 to Wertheim points out that a rise in the working temperature leads to a decrease in hardness of the cutting insert with a consequent increase in wear of the cutting insert. Each one of the Lagerbeg patent and the Wertheim patent discuss the importance of delivering coolant to the insert-chip interface.

Other patent documents disclose various ways to or systems for delivering coolant to the insert-chip interface. In this regard, U.S. Pat. No. 6,045,300 to Antoun discloses using high pressure and high volume delivery of coolant to address heat at the insert-chip interface. U.S. Patent Application Publication No. 2003/00820118 to Kreamer discloses grooves between the cutting insert and a top plate. Coolants flows through the grooves to address the heat at the insert-chip interface. U.S. Pat. No. 5,901,623 to Hong discloses a coolant delivery system for applying liquid nitrogen to the insert-chip interface.

It is readily apparent that in a chipforming and material removal operation, higher operating temperatures at the insert-chip interface can have a detrimental impact on the useful tool life through premature breakage and/or excessive wear. It therefore would be highly desirable to provide a cutter assembly (e.g., a milling cutter assembly), as well as a cutting insert (e.g., a milling insert), used for chipforming and material removal operations wherein there is an improved delivery of coolant to the interface between the milling insert and the workpiece (i.e., the insert-chip interface, which is the location on the workpiece where the chip is generated).

In a milling operation, the chip generated from the workpiece can sometimes stick (e.g., through welding) to the surface of the cutting insert (e.g., a milling insert). The build up of chip material on the cutting insert in this fashion is an undesirable occurrence that can negatively impact upon the performance of the cutting insert, and hence, the overall material removal operation.

Thus, it would be highly desirable to provide a cutting assembly (e.g., a milling cutter assembly), as well as a cutting inert (e.g., a milling insert), used for chipforming and material removal operations wherein there is enhanced delivery of coolant to the insert-chip interface so as to result in enhanced lubrication at the insert-chip interface. The consequence of enhanced lubrication at the insert-chip interface is a decrease in the tendency of the chip to stick to the cutting insert.

In a cutting operation such as, for example, a milling operation, there can occur instances in which the chips do not exit the region of the insert-chip interface when the chip sticks to the cutting insert. When a chip does not exit the region of the insert-chip interface, there is the potential that a chip can be re-cut. It is undesirable for the milling insert to re-cut a chip already removed from the workpiece. A flow of coolant to the insert-chip interface will facilitate the evacuation of chips from the insert-chip interface thereby minimizing the potential that a chip will be re-cut.

Hence, it would be highly desirable to provide a cutting assembly (e.g., a milling cutter assembly), as well as a cutting inert (e.g., a milling insert), used for chipforming and material removal operations wherein there is enhanced delivery of coolant to the insert-chip interface so as to reduce the potential that a chip will be re-cut. The consequence of enhanced flow of coolant to the insert-chip interface is better evacuation of chips from the vicinity of the interface with a consequent reduction in the potential to re-cut a chip.

SUMMARY OF THE INVENTION

In one form thereof, the invention is a cutting insert for use in chipforming and material removal wherein coolant is supplied to the cutting insert. The cutting insert includes a cutting insert body that presents at least one cutting location. The cutting insert body contains a coolant entry passage through which coolant can flow. The cutting insert body has a rake surface that contains at least one discrete depression in communication with the coolant entry passageway. The discrete depression corresponds to and extends toward the cutting location.

In another form thereof, the invention is a cutting insert assembly for use in chipforming and material removal wherein the cutting insert assembly is received in a pocket of a cutter body wherein coolant can flow out of a pocket opening contained in the pocket. The cutting insert assembly includes a cutting insert body that presents at least two discrete cutting locations. The cutting insert body contains a coolant entry passage aligned with the pocket opening for coolant to flow through the coolant entry passage. The cutting insert body has a rake surface that contains at least two of the discrete depressions wherein each one of the discrete depressions corresponds to one of the cutting locations. Each one of the discrete depressions extends toward its corresponding cutting location. The assembly includes a diverter that is positioned adjacent to the cutting insert body wherein the diverter has a receiving opening aligned with the coolant entry passage to receive coolant through the coolant entry passage. The diverter includes a coolant trough in communication with the receiving opening wherein the coolant trough is aligned toward a selected one of the cutting locations whereby the coolant trough and the discrete depression corresponding to the selected cutting location define a conduit for the flow of coolant toward the selected cutting location.

In yet another form thereof, the invention is a diverter for use in conjunction with a cutting insert. The diverter comprises a central diverter body that contains a receiving opening that receives coolant from the cutting insert. The central diverter body further contains a coolant trough in communication with the receiving opening. The coolant trough extends in a radial outward direction from the receiving opening. The coolant trough has a distal tapered flange.

In yet another form, the invention is a milling cutter assembly for use in chipforming material removal wherein coolant is supplied to the milling cutter from a coolant source. The milling cutter comprises a milling cutter body that contains a coolant reservoir in communication with a coolant source. The milling cutter body further contains a pocket that has a pocket opening in communication with the coolant reservoir. There is a cutting insert body that presents at least two discrete cutting locations. The cutting insert body contains a coolant entry passage aligned with the pocket opening for coolant to flow through the coolant entry passage. The cutting insert body has a rake surface that contains at least two of the discrete depressions wherein each one of the discrete depressions corresponding to one of the cutting locations, and each one of the discrete depressions extends toward its corresponding cutting location. There is a diverter that is positioned adjacent to the cutting insert body wherein the diverter has a receiving opening aligned with the coolant entry passage to receive coolant through the coolant entry passage. The diverter includes a coolant trough in communication with the receiving opening wherein the coolant trough is aligned toward a selected one of the cutting locations whereby the coolant trough and the discrete depression corresponding to one of the selected cutting locations define a conduit for the coolant to flow toward the selected cutting location.

BRIEF DESCRIPTION OF THE DRAWINGS

The following is a brief description of the drawings that form a part of this patent application:

FIG. 14 is a top view of the rake surface of the milling insert of FIG. 6;

FIG. 14A is a cross-sectional view of the milling insert of FIG. 14 taken along section line 14A-14A of FIG. 14;

FIG. 14B is a cross-sectional view of the milling insert of FIG. 14 taken along section line 14B-14B of FIG. 14;

FIG. 14C is an isometric view of the milling insert of FIG. 14;

DETAILED DESCRIPTION

Figure 1:
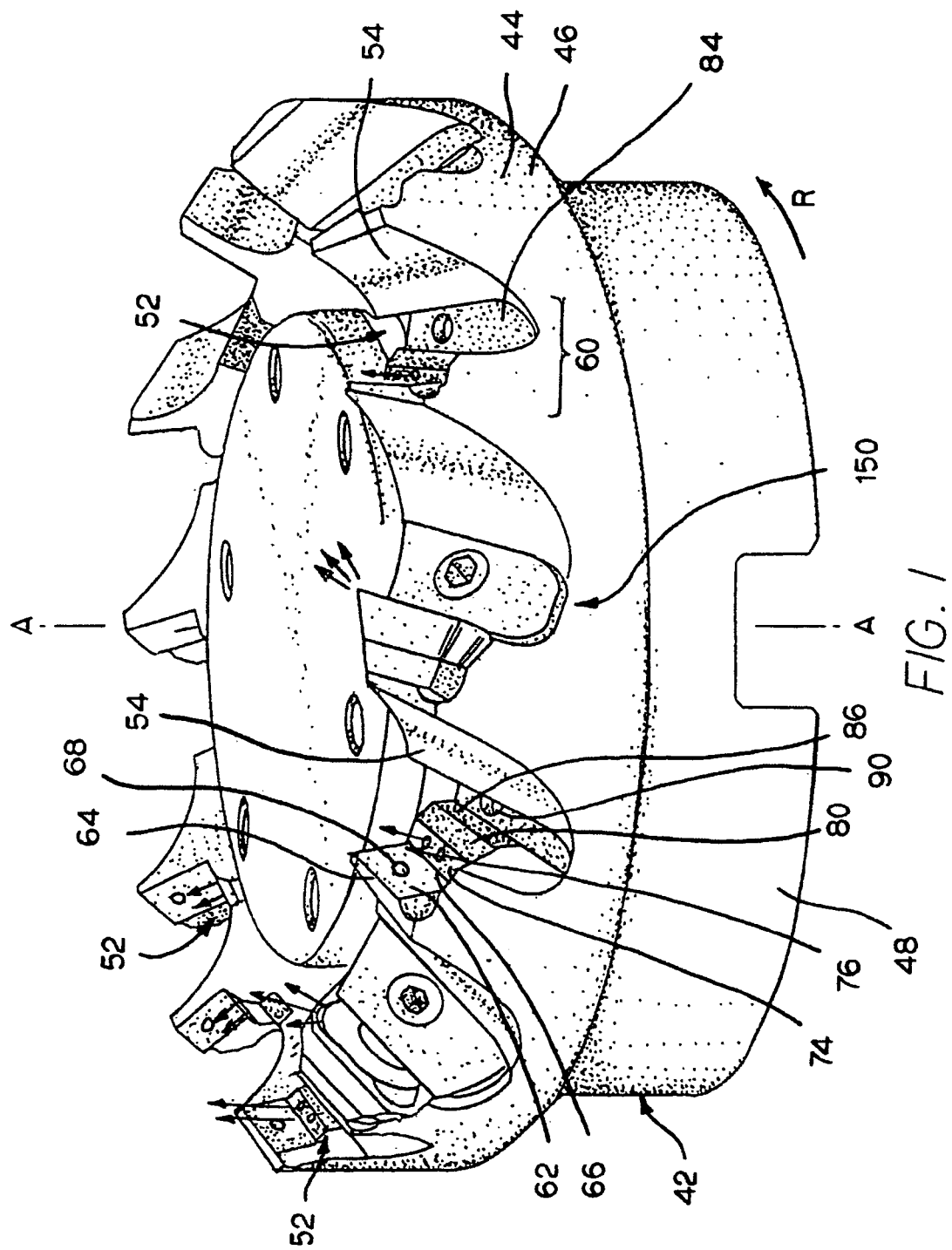
FIG. 1 is an isometric view of a specific embodiment of the milling cutter assembly of the invention wherein the milling cutter body presents pockets spaced about the circumference thereof, and wherein some of the pockets are shown being empty (i.e., without a milling insert assembly therein), and two of the pockets are show as containing a milling insert assembly with the flow of coolant shown by arrows.
Figure 2:
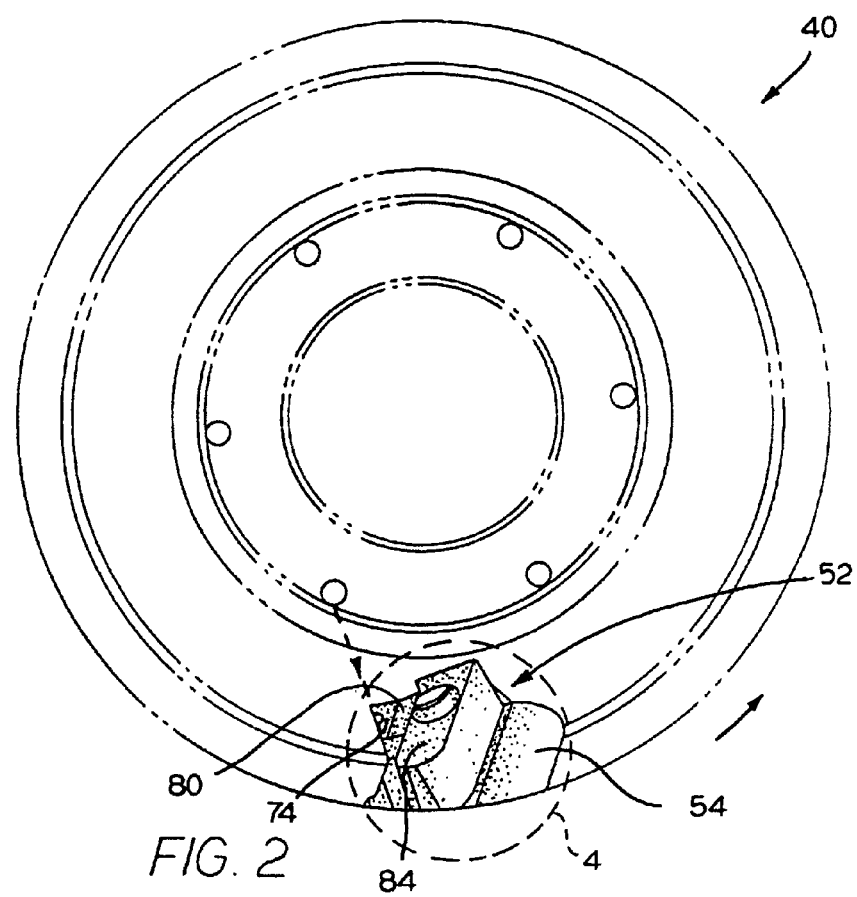
FIG. 2 is an isometric top view of one pocket contained in the cutting rim of the milling cutter body showing the leading concave surface and the seating section, and wherein the pocket is illustrated in the environment of the milling cutter body shown in phantom.
Figure 3:
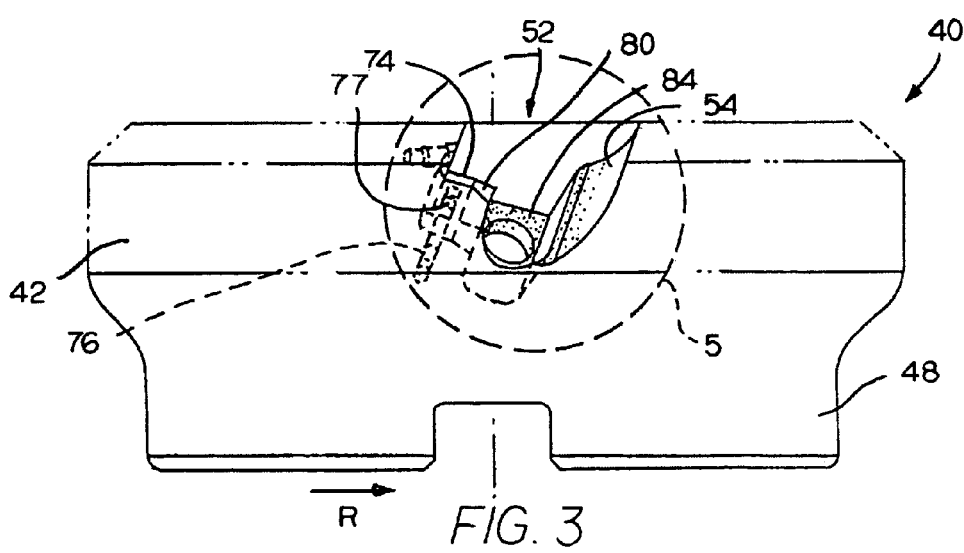
FIG. 3 is an isometric side view of one pocket contained in the cutting rim of the milling cutter body showing the leading concave surface and the seating section, and wherein the pocket is illustrated in the environment of the milling cutter body shown in phantom.
Figure 4:
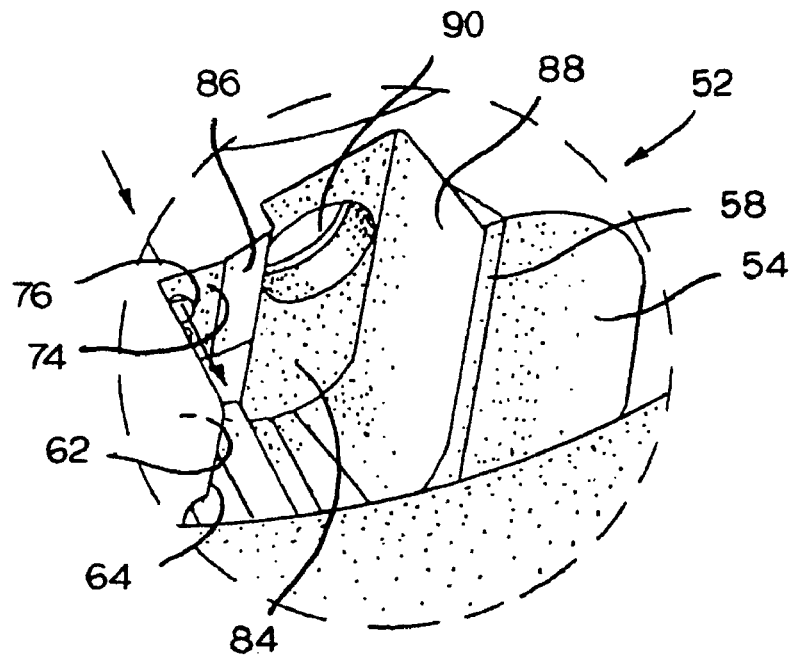
FIG. 4 is an enlarged isometric view of the pocket as encompassed by circle 4 in FIG. 2.

Referring to the drawings, FIG. 1 illustrates a specific embodiment of the milling cutter assembly of the invention generally designated as 40 wherein the milling cutter assembly 40 is for use in chipforming and material removal operations (or a milling cutter assembly for use in material removal by chip formation). In such an operation, the material is removed from a workpiece. In operation, the milling cutter assembly 40 rotates in the direction indicated by the arrow "R".

Milling cutter assembly 40 includes a generally cylindrical milling cutter body generally designated as 42 that has a cutting rim 44 with a peripheral surface 46. Milling cutter 40 further includes a depending integral collar 48 that depends downward (as viewed in FIG. 1) from the cutting rim 44. In this specific embodiment, milling cutter assembly 40 further contains a plurality of spaced-apart pockets generally designated as 52 in the peripheral surface 46 of the cutting rim 44. As will be described in more detail hereinafter, each pocket 52 receives and securely retains a milling insert assembly therein.

It should be appreciated that the milling cutter body 42 may contain a number of pockets different from that shown in this specific embodiment. Further, it should also be appreciated that the spacing between the pockets may be different from that disclosed herein. In this regard, the number and position of the pockets can vary depending upon the specific application for the milling cutter assembly. Applicants do not intend to limit the scope of the invention to the specific geometry of the milling cutter body and orientation of the pockets therein such as those shown in the drawings herein.

Figure 5:
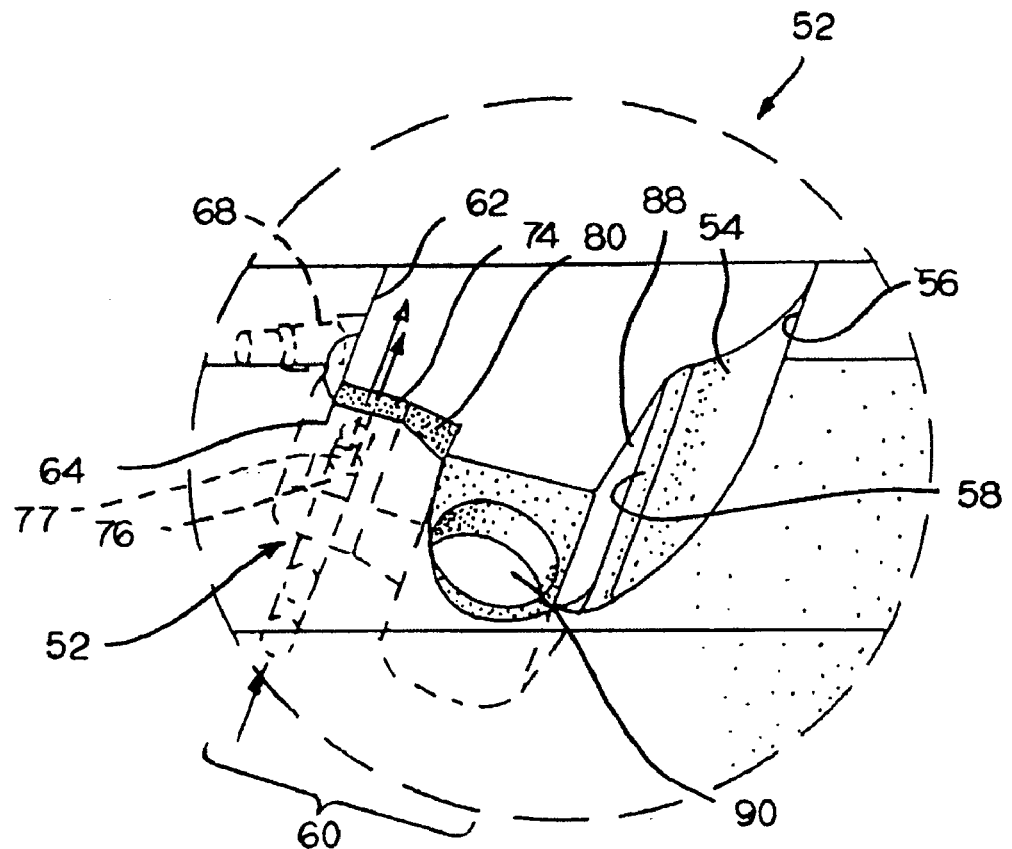
FIG. 5 is an enlarged isometric view of the pocket as encompassed by the circle 5 in FIG. 3.

Each pocket 52 has a leading concave surface 54 and a seating section (see bracket 60 in FIGS. 1 and 5) that is contiguous with and trails the leading concave surface 54. A transition region 58 provides a transition between the concave surface 54 and the seating section 60. In the context of this invention, the terms "leading" and "trailing" (as well as like related terms) refer to the relative position of the structural aspects of the pocket and the milling insert assembly in reference to the operation of the milling cutter assembly. For example, in reference to the same component, a portion there of that is "leading" is rotationally ahead of a portion thereof that is "trailing" during the operation of the milling cutter assembly. The use of these relative terms is not intended to be restrictive of the scope of the invention, but only to define the various features of the structure relative to one another.

The seating section 60 includes a seating surface 62 at the trailing end of the seating section 60. Seating surface 62 has a radial disposition and an axial disposition. Seating surface 62 has a top edge 64 and a bottom edge 66. The milling cutter body 42 contains a closed threaded bore 68 that has a termination in the seating surface 62. The threaded bore 68 receives a threaded fastener as described hereinafter. The use of the terms "top" and "bottom" and the like are in reference to the relative orientation of the structural components as shown in the position as illustrated in FIG. 1. The use of these relative terms is not intended to be restrictive of the scope of the invention, but only to define the various features of the structure relative to one another.

Seating section 60 further contains a trailing inclined seating surface 74 that joins the seating surface 62. The milling cutter body 42 contains two coolant passages 76 that open at the trailing inclined seating surface 74 as shown by openings 77. Openings 77 in the trailing inclined surface 74 can be considered to be pocket openings. These coolant passages 76 provide a conduit for the flow of coolant to the milling insert contained in the pocket as will be described hereinafter. The flow of coolant from the coolant passages 76 is shown by arrows in FIG. 1.

The seating section 60 also contains a leading inclined seating surface 80 that is contiguous with the trailing inclined seating surface 74. When the milling insert assembly is retained within the pocket, the milling insert rests on (and is supported by) the leading inclined seating surface 80 and the shim rests on and is supported by the trailing inclined seating surface 74. It should be appreciated that the leading inclined seating surface 80 and the trailing inclined seating surface 74 have a radial disposition and an axial disposition.

The seating section 60 further includes a clamp seating surface 84 that is adjacent to the leading inclined seating surface 80. A shoulder 86 joins the leading inclined seating surface 80 with the clamp seating surface 84. Another shoulder 88 provides a transition between the clamp seating surface 84 and the leading concave surface 54. The clamp seating surface 84, as well as the shoulders 86 and 88, have a radial and an axial disposition. The milling cutter body 42 contains a threaded hole (or aperture) 90 that opens at the clamp seating surface 84. Threaded hole 90 is designed to receive a retention pin that passes through a clamp wherein the clamp assists to securely retain the shim and milling insert in the pocket.

Figure 6:
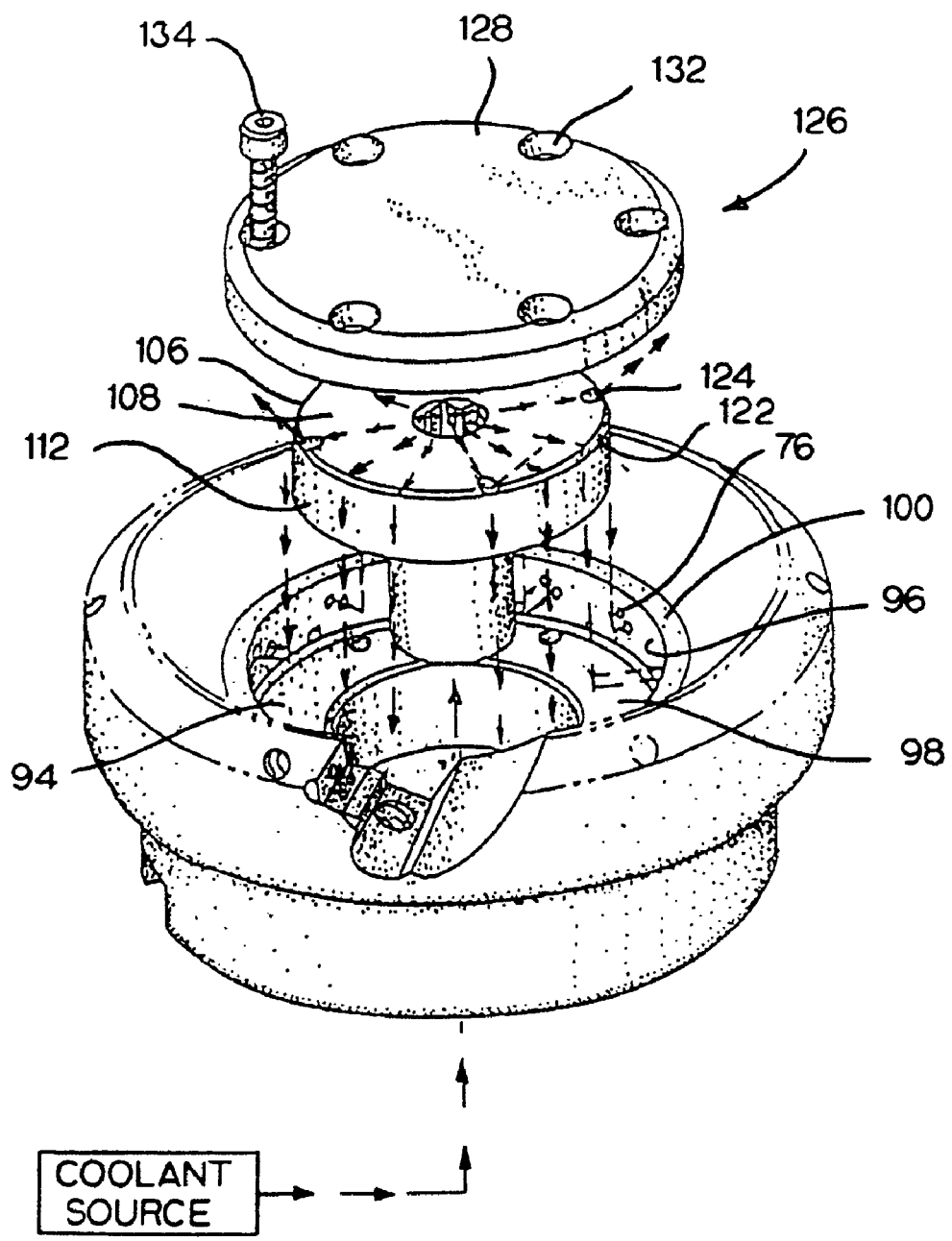
FIG. 6 is an isometric view of the milling cutter assembly of FIG. 1 showing the milling cutter body with the reservoir cap and the lock screw exploded away from the milling cutter body to expose the central coolant reservoir, and wherein the flow of coolant is illustrated by arrows.

As illustrated in FIG. 6, the milling cutter body 42 further includes a central coolant (or fluid) reservoir 94 that is in communication with a coolant source designated in FIG. 6 as COOLANT SOURCE. The central coolant reservoir 94 is defined (at least in part) by a central upstanding wall 96 which has an upward (or has a generally vertical orientation as viewed in FIG. 6). The upstanding wall 96 extends upwardly from the bottom surface 98 of the milling cutter body 42 wherein the bottom surface 98 also defines (in part) the central coolant reservoir 94. The central upstanding wall 96 has a top edge 100 as viewed in FIG. 6.

The central upstanding wall 96 contains a plurality of pairs of coolant passages 76 that provide fluid communication between the coolant reservoir 94 and the pocket 52. Each pair of coolant passages 76 corresponds to a pocket 52 in that coolant is supplied to the corresponding pocket 52 through the corresponding pair of coolant passages 76. Although applicants do not intend to be restricted to coolant passages 76 of any specific size or internal geometry, applicants contemplate that the dimension and geometry of the coolant passage 76 are such to provide for adequate flow of coolant to the corresponding pocket, and hence, to the corresponding milling insert retained in the pocket.

Figure 7:
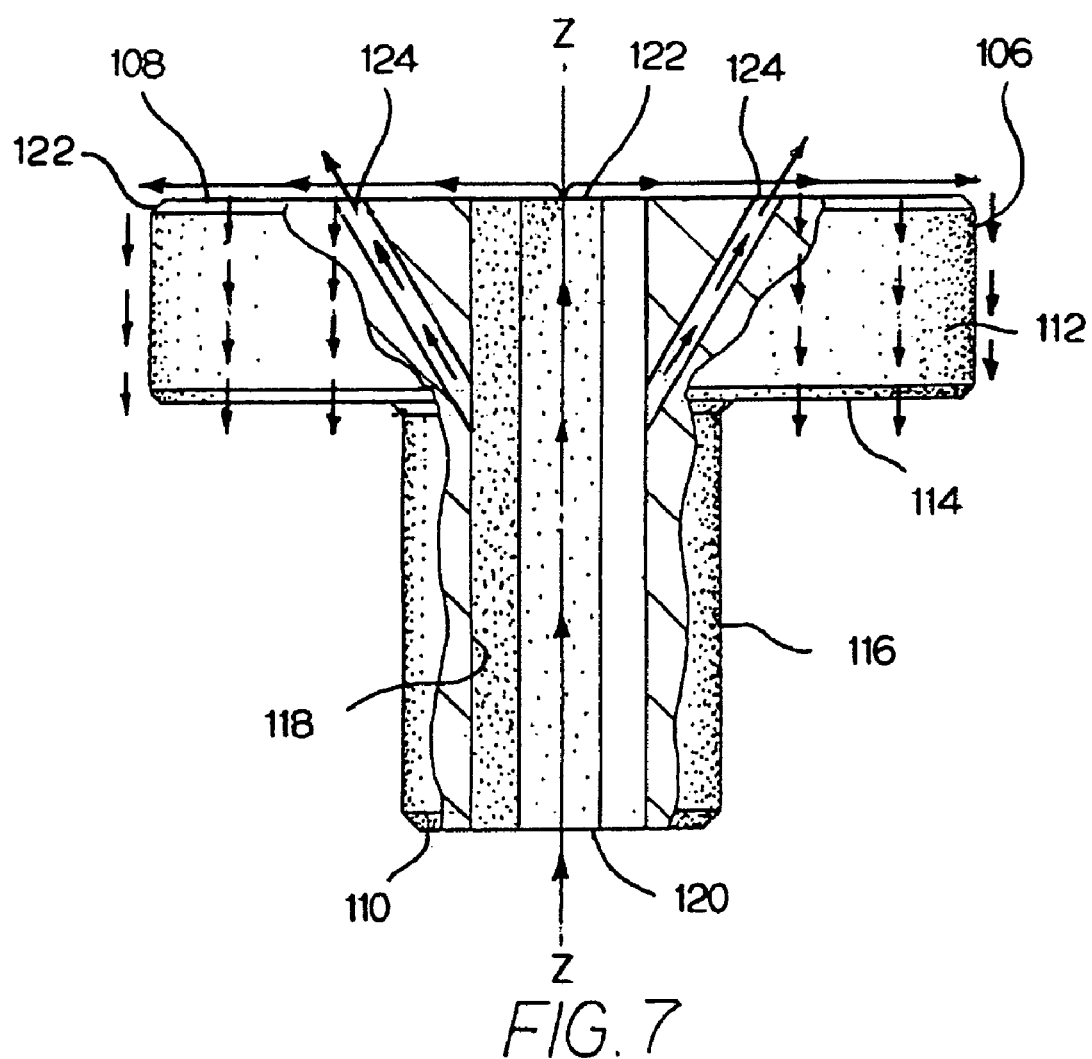
FIG. 7 is a side view of the lock screw of FIG. 6 with a portion thereof cut away to show the central bore and auxiliary inclined bores thereof, and wherein the flow of coolant is shown by arrows.

As shown in FIGS. 6 and 7, the milling cutter assembly 40 further contains a lock screw generally designated as 106. Lock screw 106 has a top end 108 and a bottom end 110 as viewed in FIG. 7. Lock screw 106 has an enlarged diameter section 112, which defines a shoulder 114, adjacent to the top end 108 thereof. An elongate integral cylindrical shank 116 projects from the enlarged diameter section 112. The lock screw 106 contains a central longitudinal hexagonal bore 118 therein that travels through the length thereof.

The lock screw 106 further contains a plurality of radial inclined bores 124 disposed at an angle to the longitudinal axis Z-Z of the lock screw 106. Each one of the inclined bores 124 provides fluid communication between central bore 118 and the top circular corner 122 of the lock screw 106. These inclined bores 124 provide additional passages through which coolant can travel from the coolant source to the coolant reservoir. As shown in FIGS. 6 and 7 by the arrows, coolant enters the hexagonal bore 118 at the bottom end 120 thereof and flows through bore 118 so that the coolant exits the hexagonal bore 118 at the top end 122 thereof and flows over the top end 122 in all directions. The coolant also exits the central bore 118 via the inclined bores 124 as shown by the arrows. The coolant that exits the lock screw 106 (whether via the central bore 118 or the inclined bores 124) then flows to enter the central coolant reservoir 94 as illustrated by the arrows.

Figure 8:
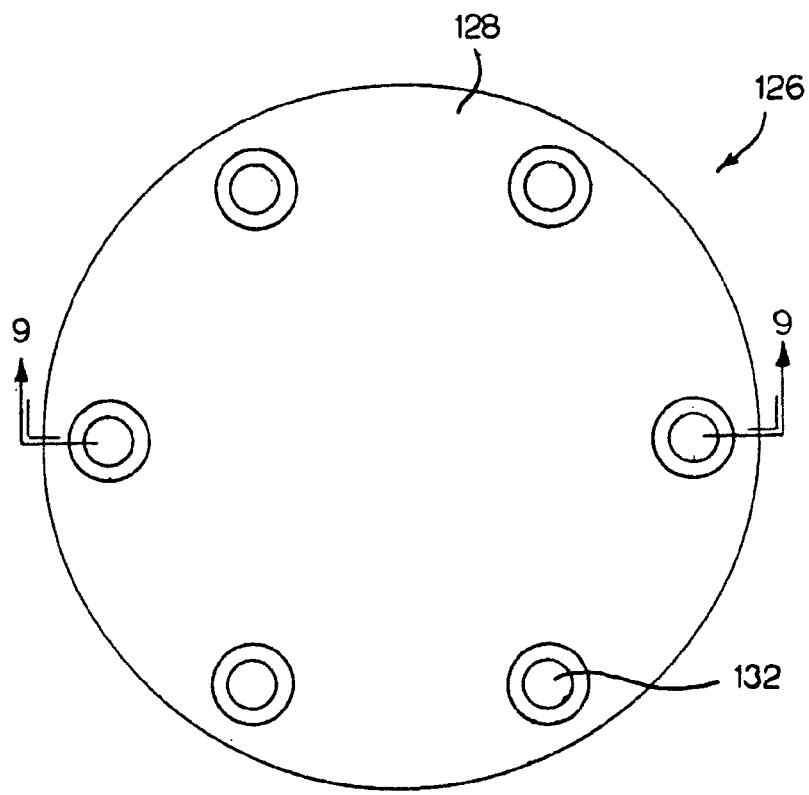
FIG. 8 is a top view of the reservoir cap of FIG. 6.
Figure 9:
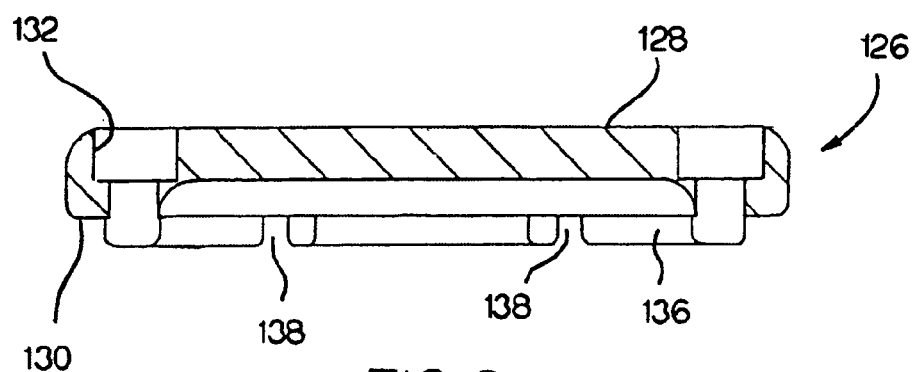
FIG. 9 is a cross-sectional view of the reservoir cap taken along section line 9-9 of FIG. 8.

As illustrated in FIGS. 8 and 9, the milling cutter assembly 40 also includes a reservoir cap generally designated as 126, which defines in part the central coolant reservoir 94. Reservoir cap 126 has a top surface 128 and a bottom surface 130. The reservoir cap 126 contains a plurality of bolt holes 132, which are located in an equi-spaced fashion at the periphery of the reservoir cap 126. Each one of the bolt holes 132 is adapted to receive a bolt 134 (see FIG. 6) to affix the reservoir cap 126 to the milling cutter body 42. The reservoir cap 126 further includes a depending generally circular integral flange 136 that contains a plurality of notches 138 wherein the notches 138 are equi-spaced about the circumference of the flange 136.

Referring to FIGS. 10 through 21, the milling cutter assembly 40 further includes a plurality of milling insert (or cutting insert) assemblies wherein each one of the milling inserts is generally designated as 150. It should be appreciated that applicants contemplate that the term "cutting insert" is inclusive (without limitation) of milling inserts and turning inserts, as well as other styles and kinds of inserts used to engage the workpiece and remove material in a material removal operation such as, for example, a chipforming and material removal operation.

Figure 10:
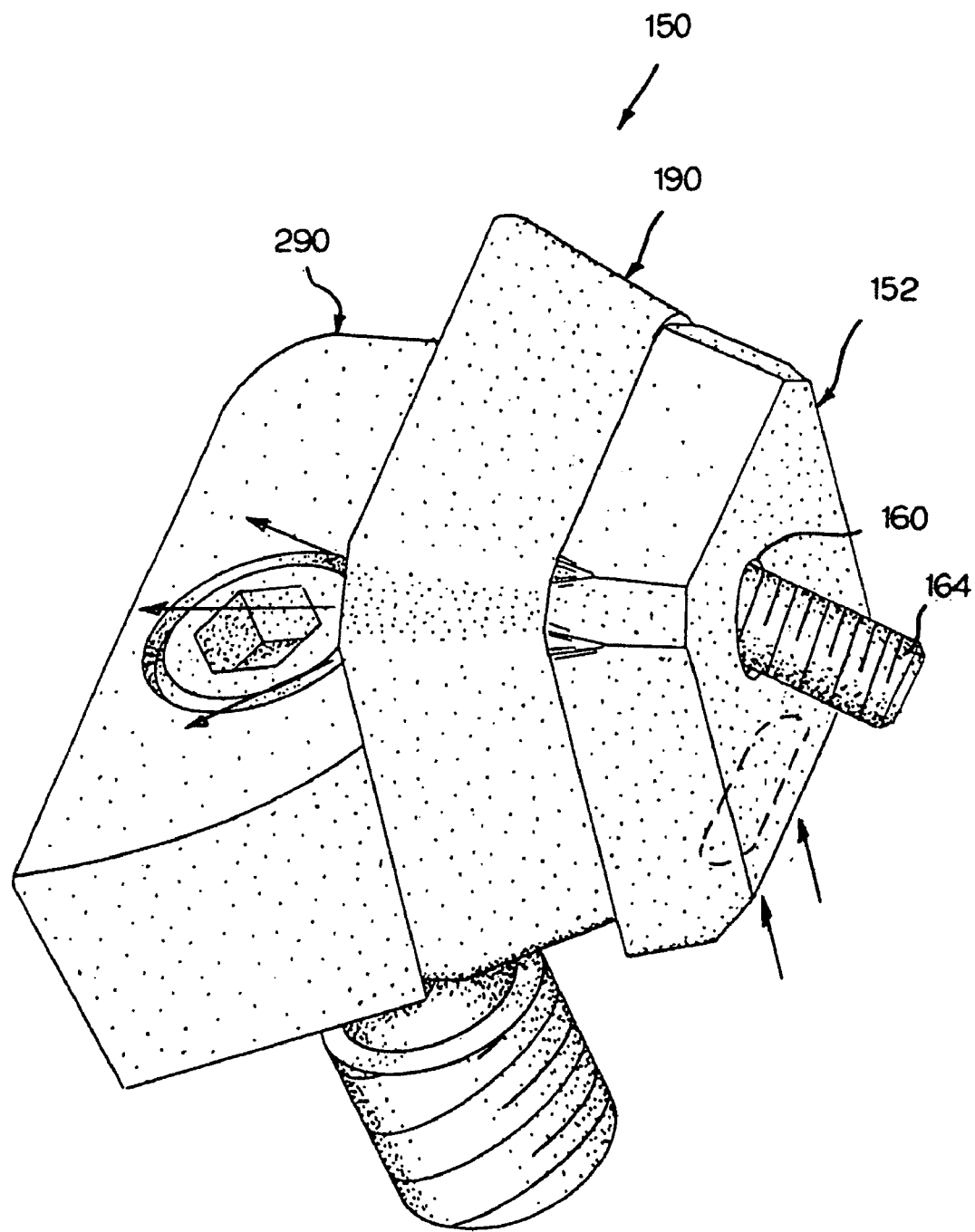
FIG. 10 is an isometric view of the milling insert assembly of FIG. 1 wherein the components are assembled together, and the flow of coolant is shown by arrows entering the side of the shim through an elongate slot and exiting the milling insert adjacent to the cutting edge that is in engagement with the workpiece (i.e., the engaged cutting edge)

As is apparent from FIG. 1, each one of the pockets 52, and in particular the seating sections 60, receive and retain a milling insert assembly 150. The milling insert assembly 150 contains a number of components; namely, the milling insert (which can be more broadly considered as a cutting insert), the shim, the clamp and threaded members, which are described in more detail hereinafter. As shown in FIG. 1 and FIG. 10, coolant exists the milling insert at a location adjacent to a selected cutting location (or cutting edge). As will become apparent, there are three different embodiments of the shim.

Figure 11:
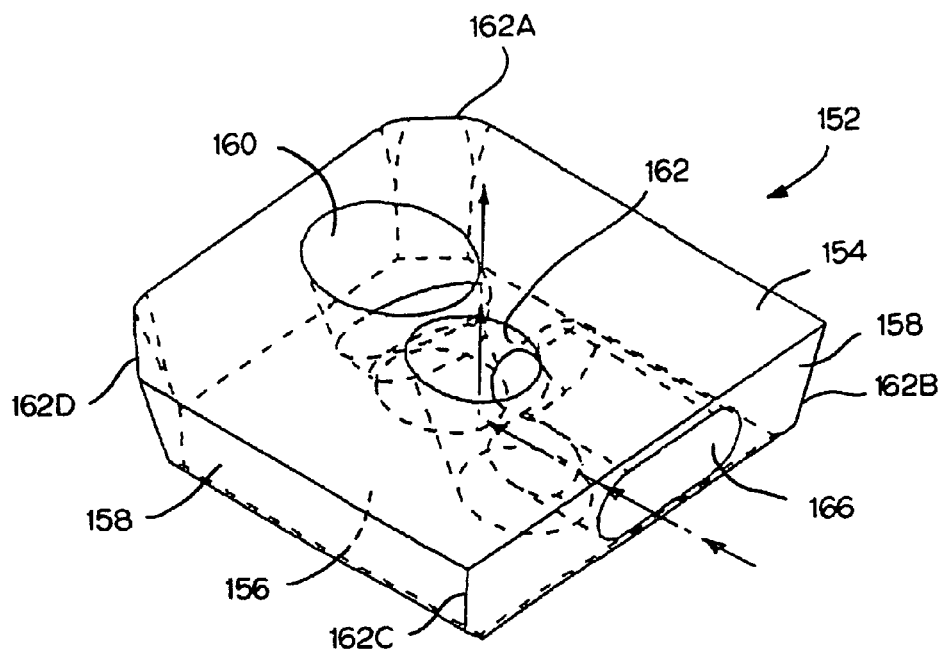
FIG. 11 is an isometric view of one specific embodiment of the shim as used in the milling cutter assembly of FIG. 6 and wherein the passages in the shim are shown by dashed lines and the flow of coolant is shown by arrows.

As mentioned above, the milling insert assembly 150 includes a shim generally designated as 152. One specific embodiment of the shim 152 is illustrated in FIGS. 10 and 11. Shim 152 presents a top surface 154, a bottom surface 156 and a peripheral flank (or edge) surface 158. Shim 152 contains a trio of bores therein. One of these bores is a fastener bore 160 that receives a threaded member 164 that affixes the shim 152 and the milling insert to the milling cutter body 42 in a fashion known to those of ordinary skill in the relevant art. Shim 152 also presents four corners (162A, 162B, 162C, 162D) wherein corners 162B and 162C are sharp corners and corners 162A and 162D are flat corners defined by a flat surface.

Each one of the other two bores, which are in fluid communication with one another, contained in the shim 152 provides a passageway for coolant to flow from the coolant passage 76 that opens in the trailing inclined seating surface 74 to the top surface 154 of the shim 152. These two bores together can be considered to be an internal coolant passageway. One of these bores is an elongate slot 166 that opens in one of the peripheral flank edges 158 and travels in a radial inward direction until it intersects with the other bore, which is central bore 168. Central bore 168 opens in the top surface 154 of the shim 152. As shown by the arrows, coolant enters via slot 166 and flows to the central bore 160. Coolant (as represented by the vertical arrows as viewed in FIG. 11) flows from the central bore 168 into the milling insert as will be described hereinafter.

Figure 12:
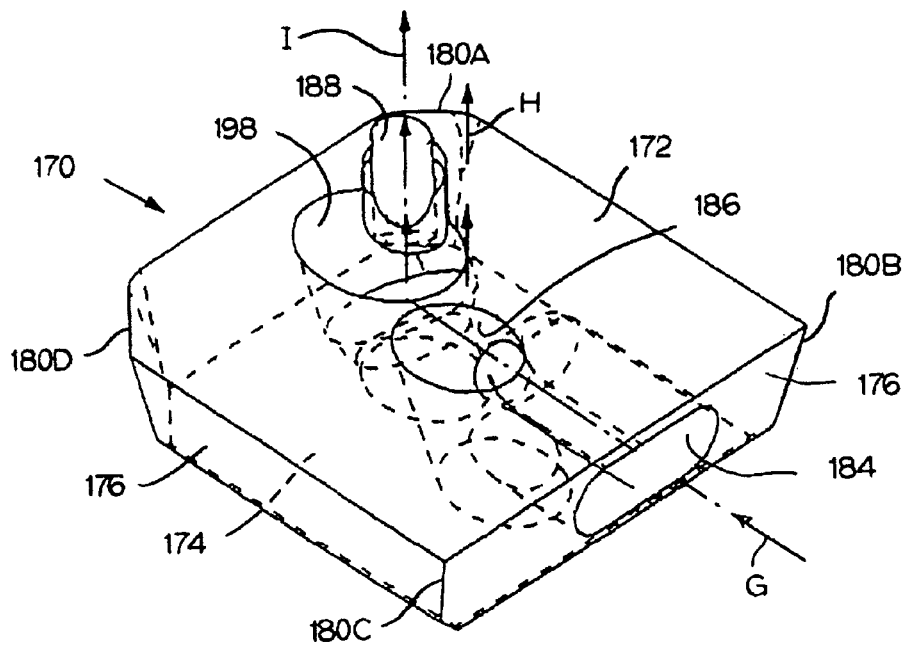
FIG. 12 is an isometric view of a second specific embodiment of a shim suitable for use in the milling cutter assembly illustrated in FIG. 6 and wherein the passages in the shim are shown by dashed lines and the flow of coolant is shown by arrows.

FIG. 12 illustrates an alternate embodiment of the shim. In this regard, the shim generally designated as 170 presents a top surface 172, a bottom surface 174 and a peripheral flank surface or edge 176. Shim 170 contains four bores therein. One bore is a fastener bore 178 that receives a threaded member 182 that affixes the shim 170 and the milling insert to the milling cutter body 42 in a fashion known to those of ordinary skill in the relevant art. Shim 170 has four corners (180A, 180B, 180C, 180D) wherein corners 180B and 180 C are sharp corners and corners 180A and 180D are flat corners defined by a flat surface.

Two of the other bores provides a passageway for coolant to flow from the coolant passage 76 that opens in the trailing inclined seating surface 74 to the top surface 172 of the shim 170. These two bores together can be considered to bean internal coolant passageway. One of these bores is an elongate slot 184 that opens in one of the peripheral flank surfaces 176 and travels in a radial inward direction until it intersects with a central bore 186. Central bore 186 opens in the top surface 172 of the shim 170.

Finally, the fourth bore, which is radial bore 188, provides a fluid passageway to direct flowing coolant toward the peripheral surface of the shim 170 adjacent to the engaged cutting edge of the milling insert. In this regard, radial bore 188 is in fluid communication with the elongate slot 184 so that at least some of the coolant flowing into the slot 184 flows into radial bore 188. Radial bore 188 can be considered to be a radial coolant passageway that is in communication with the internal coolant passageway.

Figure 13:
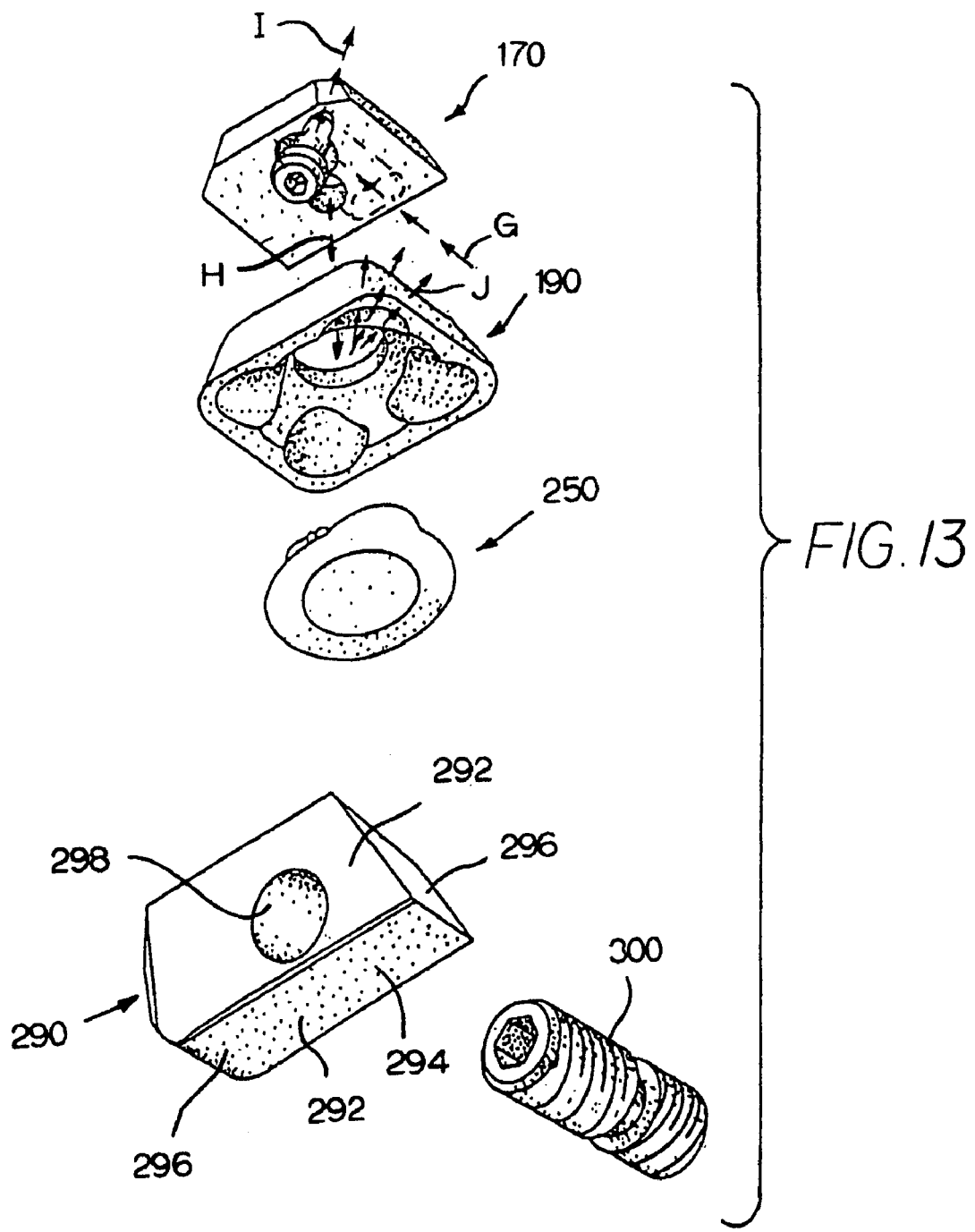
FIG. 13 is an isometric view of the milling insert assembly with the components exploded apart along a central axis and wherein the specific embodiment of the shim is shown in FIG. 12 and the coolant flow is shown by arrows.

Radial bore 188 is located to open at the leading surface 172 near the one corner (180A) of the shim 170. As will be described hereinafter, when the shim 170 is assembled with the milling insert, the shim is oriented so corner 180A is adjacent to the cutting edge of the milling insert that engages the workpiece. What this means is that when in operation, as shown by arrows (designated as "G") coolant flows into the shim 170 at the elongate slot 170 and into the central bore 186 and into the radial bore 188. Coolant flows (as represented by arrows "H") from the central bore 186 into the milling insert as described later herein. Further, coolant (as represented by arrows "I") flows out of the radial bore 188 and over the peripheral flank surface of the milling insert adjacent to the engaged cutting edge to provide additional flow of coolant toward the selected cutting location (i.e., the location where the milling insert engages the workpiece) and in the vicinity of the insert-chip interface. Although the flow of coolant exiting the milling insert will be described in more detail, FIG. 13 shows coolant (arrows "I") exiting the milling insert.

Referring to FIGS. 14 through 14C, milling insert assembly 150 further includes a milling insert 190. It is typical that the milling insert 190 is made by a powder metallurgical technique. In this regard, the starting powder components for the milling insert are first blended or milled into a starting powder mixture. A lubricant or fugitive binder is typically included as a starting component. The starting powder mixture is then pressed into the shape of a milling insert (i.e., a green compact) that has partial density.

The green compact is then subjected to a consolidation treatment typically at an elevated temperature and optionally under pressure. The consolidation treatment can include pressure sintering, vacuum sintering, hot isostatic pressing and other known consolidation processes. The resultant article is an essentially fully dense post-consolidation milling insert. The post-consolidation milling insert may be subjected to various finishing operations such as grinding or blasting to the like to form an uncoated milling insert.

The uncoated milling insert may be useful without a coating thereon. In the alterative, it may be beneficial to apply a coating scheme to the uncoated milling insert to form a coated milling insert. The coating scheme can be any one of a wide variety of suitable coating schemes comprising one or more separate coating layers and applied by any one or more of a wide variety of coating deposition techniques including physical vapor deposition (PVD) and chemical vapor deposition (CVD).

The milling insert may be made from any one of materials that are suitable for use as a cutting insert. The following materials are exemplary materials useful for a cutting insert: tool steels, cemented carbides, cermets or ceramics. In reference to tool steels, the following patent documents disclose tool steels suitable for use as a cutting insert: U.S. Pat. No. 4,276,085 for High speed Steel, U.S. Pat. No. 4,880,461 for Superhard high-speed tool steel, and U.S. Pat. No. 5,252,119 for High Speed Tool Steel Produced by Sintered Powder and Method of Producing the Same. In reference to cemented carbides, the following patent documents disclose cemented carbides suitable for use as a cutting insert: U.S. Patent Application Publication No. US2006/0171837 A1 for a Cemented Carbide Body Containing Zirconium and Niobium and Method of Making the Same, U.S. Reissue Pat. No. 34,180 for Preferentially Binder Enriched Cemented Carbide Bodies and Method of Manufacture, and U.S. Pat. No. 5,955,186 for a Coated Cutting Insert with A C Porosity Substrate Having Non-Stratified Surface Binder Enrichment. In reference to cermets, the following patent documents disclose cermets suitable for use as a cutting insert: U.S. Pat. No. 6,124,040 for Composite and Process for the Production Thereof, and U.S. Pat. No. 6,010,283 for a Cutting Insert of a Cermet Having a Co—Ni—Fe Binder. In reference to ceramics, the following patent documents disclose ceramics suitable for use as a cutting insert: U.S. Pat. No. 5,024,976 for an Alumina-zirconia-silicon carbide-magnesia Ceramic Cutting Tools, U.S. Pat. No. 4,880,755 for a Sialon Cutting Tool Composition, U.S. Pat. No. 5,525,134 for a silicon Nitride Ceramic and Cutting Tool made Thereof, U.S. Pat. No. 6,905,992 for a Ceramic Body Reinforced with Coarse Silicon Carbide Whiskers and Method for Making the Same, and U.S. Pat. No. 7,094,717 for a SiAlON Containing Ytterbium and Method of Making.

The milling insert 190 presents a rake surface 192, an opposite bottom seating surface 194, and peripheral flank surface 196. The rake surface 192 and the bottom seating surface 194 are disposed to be generally parallel to one another. As shown in FIG. 14A, the peripheral flank surface 196 is disposed at an included angle B with respect to a central axis C-C.

In the specific embodiment shown in the drawings, the milling insert 190 has four separate and distinct cutting edges designated as 238, 240, 242 and 244. Each one of these cutting edges (238, 240, 242, 244) is at the intersection of the rake surface 192 and a portion of the peripheral flank surface 196. Each one of these cutting edges can be considered to be a cutting location which means a location on the milling insert 190 that engages the workpiece so as to remove material therefrom when the material removal operation takes place.

The rake surface 192 of the milling insert 190 contains an indention (or a central indention) 200 therein. The central indention 200 surrounds a central aperture (or coolant entry passage) 202 contained in the rake surface 192. The rake surface 192 of the milling insert 190 further contains a plurality of discrete depressions therein wherein each discrete depression intersects the central indention 200. As will be described in more detail hereinafter, each discrete depression also corresponds to a specific cutting edge (or cutting location) of the milling insert 190.

In regard to the description of the discrete depressions, since each discrete depression presents essentially the same geometry, a more detailed description of one of the discrete depressions will suffice for the more detailed description of the other discrete depressions. In reference to the more detailed description of the discrete depressions, a first discrete depression 210 has a peripheral edge 212. The peripheral edge 212 has a radial inner portion 214 and a radial outer portion 216. The radial outer portion 216 of the discrete depression 210 terminates radial inward of, but still proximate to, the cutting edge 242 of the milling insert 190. There is a peripheral portion 218 of the rake surface 192 that separates the radial outer portion 216 of the discrete depression 210 from the cutting edge 242. It thus can be said that discrete depression 210 corresponds to the cutting edge 242, which means that when coolant flows through the discrete depression 210, the coolant exits adjacent to and actually underneath (radially ahead) of the cutting edge 242. It should be appreciated that milling insert 190 can be indexed to present any one of the cutting edges for engagement with the workpiece. As will become apparent, coolant flows via the discrete depression that corresponds to the selected cutting edge for engagement with the workpiece.

The arcuate nature of the arcuate surface provides a smooth redirection of the flowing coolant in a radial outward direction without an undue amount of turbulence. It can be appreciated that the contour of the surface defining the discrete depression, which includes a decrease in the discrete depression depth (i.e., the distance between the particular surface of the discrete depression and the rake surface 192) in the radial outward direction, facilitates the efficient delivery of flowing coolant toward the cutting edge.

As can seen from the drawings, and especially FIG. 14, the discrete depression has a width coplanar with the rake surface thereof. At least from the location of the intersection between the discrete depression and the central indention, the width decreases in the radial outward direction so as to facilitate the efficient delivery of flowing coolant toward the cutting edge. In this regard, the coolant flowing in the discrete depression in the radial outward direction converges toward a radial outer portion of the discrete depression.

It can also be appreciated that the discrete depression has a volume. The volume of each discrete depression decreases in a radial outward direction so as to facilitate the efficient delivery of flowing coolant toward the cutting edge. In this regard, the coolant flowing in the discrete depression in the radial outward direction converges toward a radial outer portion of the discrete depression.

FIG. 14 illustrates that the other discrete depressions are discrete depression 230, discrete depression 232 and discrete depression 234. The geometry of each one of these other discrete depressions (230, 232, and 234) is the same as that for discrete depression 210 and for the sake of brevity is not repeated herein.

Still referring to FIG. 14, there is an arcuate sealing surface 220 located between discrete depressions 238 and 240. There is an arcuate sealing surface 222 located between discrete depressions 240 and 210. There is an arcuate sealing surface 224 located between discrete depressions 210 and 230. There is an arcuate sealing surface 226 located between discrete depressions 230 and 232. The function of these sealing surfaces is to facilitate formation of a seal between diverter 250 and the milling insert.

Figure 15:
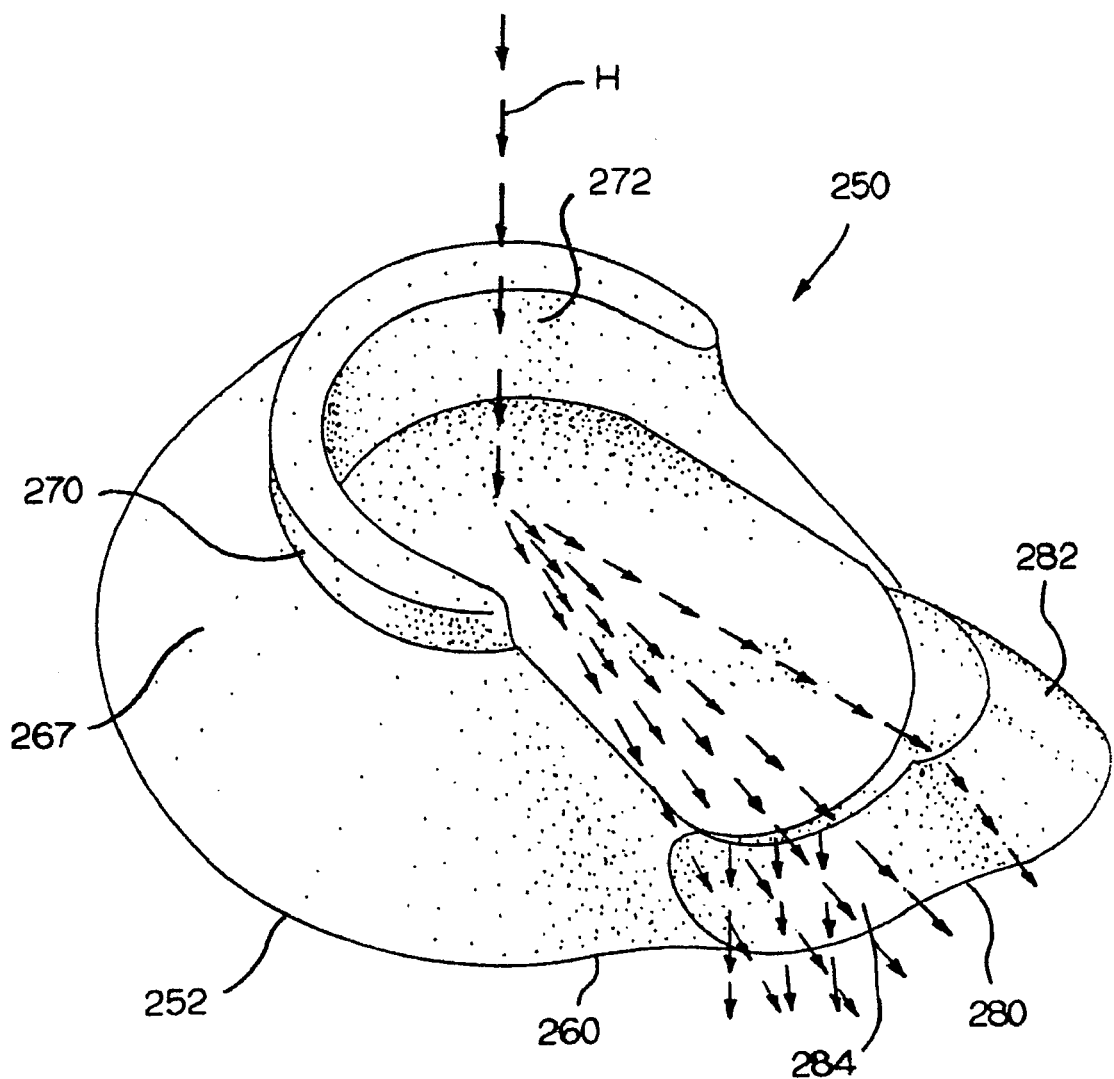
FIG. 15 is an isometric view of a first specific embodiment of a diverter member.
Figure 16:
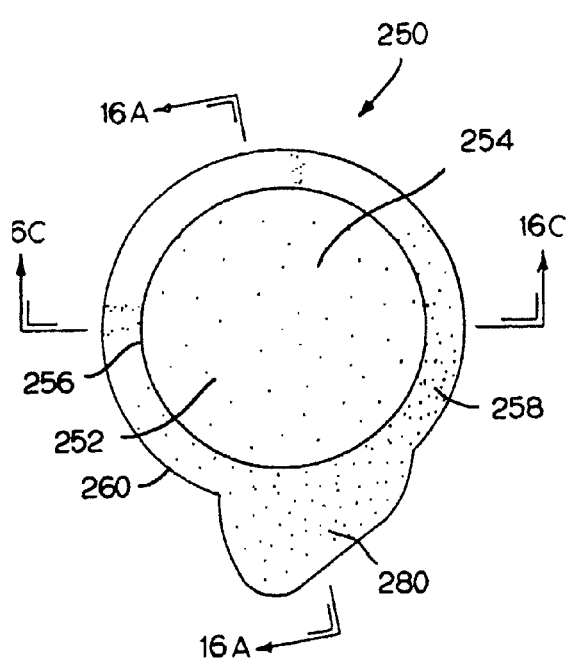
FIG. 16 is a bottom view of the diverter member of FIG. 15.
Figure 16A:
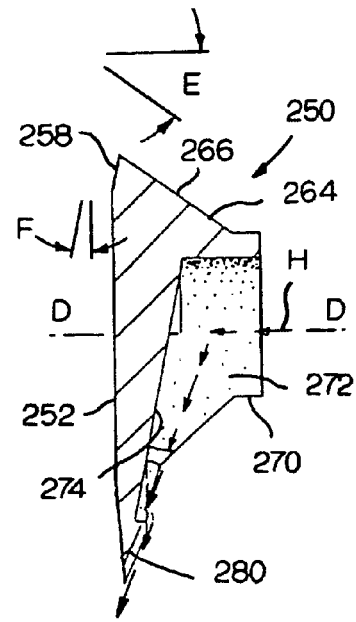
FIG. 16A is a cross-sectional view of the diverter member of FIG. 16 taken along section line 16A-16A of FIG. 16.
Figure 16B:
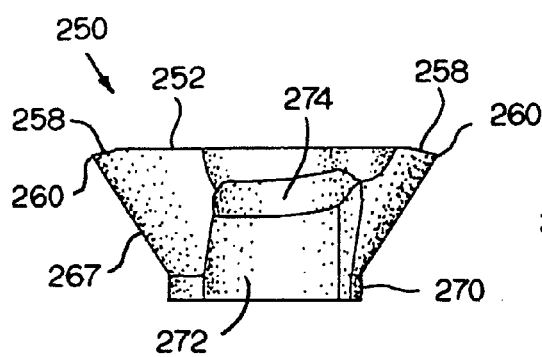
FIG. 16B is a side view of the diverter member of FIG. 16.
Figure 16C:
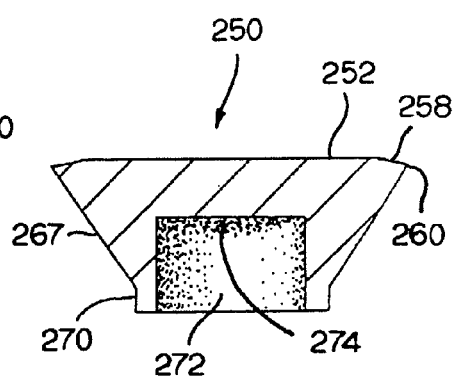
FIG. 16C is a cross-sectional view of the diverter member of FIG. 16 taken along section line 16C-16C of FIG. 16.

Referring to FIGS. 15 through 16C, the milling insert assembly 150 also contains a diverter generally designated as 250. Diverter 250 is intended to be used in conjunction with the milling insert as will be described in more detail hereinafter. Diverter 250 can be made from a variety of materials. In reference to the material selection, it is beneficial if the diverter 250 can withstand abrasion due to the flow of chips from the cutting or milling (i.e., material removal action), as well as be wear-resistant to withstand erosion due to the flow of coolant. Suitable materials for the diverter 250 include tool steels, stainless steels, cemented carbides, cermets and ceramics. Applicants also contemplate that the diverter could be coated with one or more coating layers.

Diverter 250 presents opposite surfaces; namely, a bottom surface 252 and an opposite top surface 264. When the milling cutter assembly is in operation, the bottom surface 252, which can be exposed to the chips formed from the material removal operation, is a leading surface (i.e., rotationally ahead) relative to the top surface 264. As will be described below, when the diverter 250 is assembled to the milling insert 190, the top surface 264 is positioned within the cavity (which includes the discrete depressions) contained in the rake surface 192 of the milling insert 190.

The bottom surface 252 presents a generally planar central surface portion 254 that is generally perpendicular to a central longitudinal axis (D-D) of the diverter 250. The central surface portion 254 has a circumferential edge 256. The bottom surface 252 further includes a peripheral frusto-conical surface portion 258 that extends in the radial outward direction from the circumferential edge 256. The frusto-conical surface portion 258 terminates in a peripheral edge 260 that is generally circular, except in the region of a flange as described below. The frusto-conical surface potion 258 is disposed with respect to central surface portion 254 at an angle "F".

The top surface 264 of the diverter 250 includes a central diverter body 266 that contains a collar 270 that defines a receiving opening 272. Receiving opening 272 is intended to receive flowing coolant from the coolant entry passage of the milling insert. The central diverter body 266 further contains a coolant trough 274 that extends in a radial outward direction from the receiving opening 272. The coolant trough 274 is in communication with the receiving opening 272 so that coolant is able to flow from the receiving opening 272 to and along the coolant trough 274. The coolant trough 274 terminates in a distal tapered flange 280 that has one portion 282 that extends a greater distance in the radial outward direction than another portion 284 of the distal tapered flange 280.

In addition, the top surface 264 of the diverter 250 has a frusto-conical portion 267 that extends from the peripheral edge 260 at the intersection of the top surface 252 and bottom surface 264. The frusto-conical surface portion 267 extends for most of the way around the diverter 250. In the specific embodiment, the frusto-conical surface portion 267 is disposed relative to the central axis D-D at an angle E equal to about 45 degrees. It should be appreciated that the angle E can range between about 5 degrees and about 85 degrees. The magnitude of the angle E corresponds to the contour of a corresponding surface area of the rake surface that forms the seal between the diverter and the milling insert at these surfaces.

As shown in FIG. 15, the coolant (arrow "H") enters the milling insert assembly 150 so as to flow into the receiving opening 272. The coolant impinges on the surface of the coolant trough 274 and travels in a radial outward direction the length of the coolant trough 274 passing over the surface of the tapered flange 280. The bulk of the coolant flows over the other portion 184 of the tapered flange 280 that has the lesser radial outward dimension. However, it can be expected that some of the coolant may flow over the one portion 282 of the tapered flange 280 that has the greater radial outward dimension.

Milling insert assembly 150 includes a clamp generally designated as 290. Clamp 290 has a top surface 292, a bottom surface 294 and a peripheral edge 296. Clamp 290 contains a bore 298 that is adapted to receive a threaded member or pin 300. The purpose of clamp 298 is to wedge the milling insert 190 and the diverter 250 against the shim 152 to securely retain the milling insert 190 and diverter 250 in the pocket 52 of the milling cutter body 32. The use of a clamp to mechanically retain a milling insert or the combination of a shim and milling insert in the pocket of a milling cutter body a holder is well-known to those of ordinary skill in the art of milling cutters.

In reference to the assembly of the milling insert assembly 150 in the pocket 52 of the milling cutter body 42 wherein the milling insert assembly 150 uses the shim 170 as shown in FIG. 12, the bottom surface 174 of the shim 170 is firmly pressed against the seating surface 62. The orientation of the elongate slot 184 in the shim 170 is such so that the slot 184 is in alignment (or registers) with the termination of the coolant passage 76 at the trailing inclined seating surface 74. The bottom surface 194 of the milling insert 190 is firmly pressed against the top surface 172 of the shim 170.

In order to assembly the milling insert assembly 150, the top surface 264 of the diverter 250 is firmly pressed against the rake surface 192 of the milling insert 190. When in this position, the central diverter body is contained within the cavity in the rake surface 192 of the milling insert 190.

When the diverter 250 is firmly pressed against the milling insert 190, there exist points of surface-to-surface contact between corresponding portions of the surface area of the frusto-conical surface portion 258 and portions of the central indention 200 that are between the discrete depressions. As described hereinabove, these portions are arcuate sealing surfaces 220, 222, 224 and 226. At these points of contact there are formed seals, which are essentially fluid-tight seals, between the diverter 250 and the milling insert 190.

When the diverter 250 is firmly pressed against the milling insert 190, the collar 270 of the diverter 250 (which defines the receiving opening 272) is in alignment with the coolant entry passage 202 in the milling insert 190. By being in alignment, the receiving opening 272 is able to receive coolant that flows into the milling insert 190 through the coolant entry passage 202.

When the diverter 250 is assembled to the milling insert 190, the discrete depression (210, 230, 232, 234) that is adjacent to (i.e., corresponds to) the flange 280 of the diverter 250 along with the coolant trough 274 defines a conduit that directs flowing coolant toward the corresponding cutting edge (238, 240, 242, 244) of the milling insert 190. The conduit is essentially in fluid isolation relative to the balance of the cavity of the milling insert so that essentially all of the coolant that enters the milling insert 190 flows through the conduit and toward the selected cutting edge.

The position of the flange 280 of the diverter 250 can be selected to correspond to any one of the discrete depressions and their respective selected cutting edge. Typically, because it is important to provide coolant in the vicinity of the cutting location, the selected cutting edge is the cutting edge that is in engagement with the workpiece during the material removal (e.g., milling) operation.

Figure 16D:
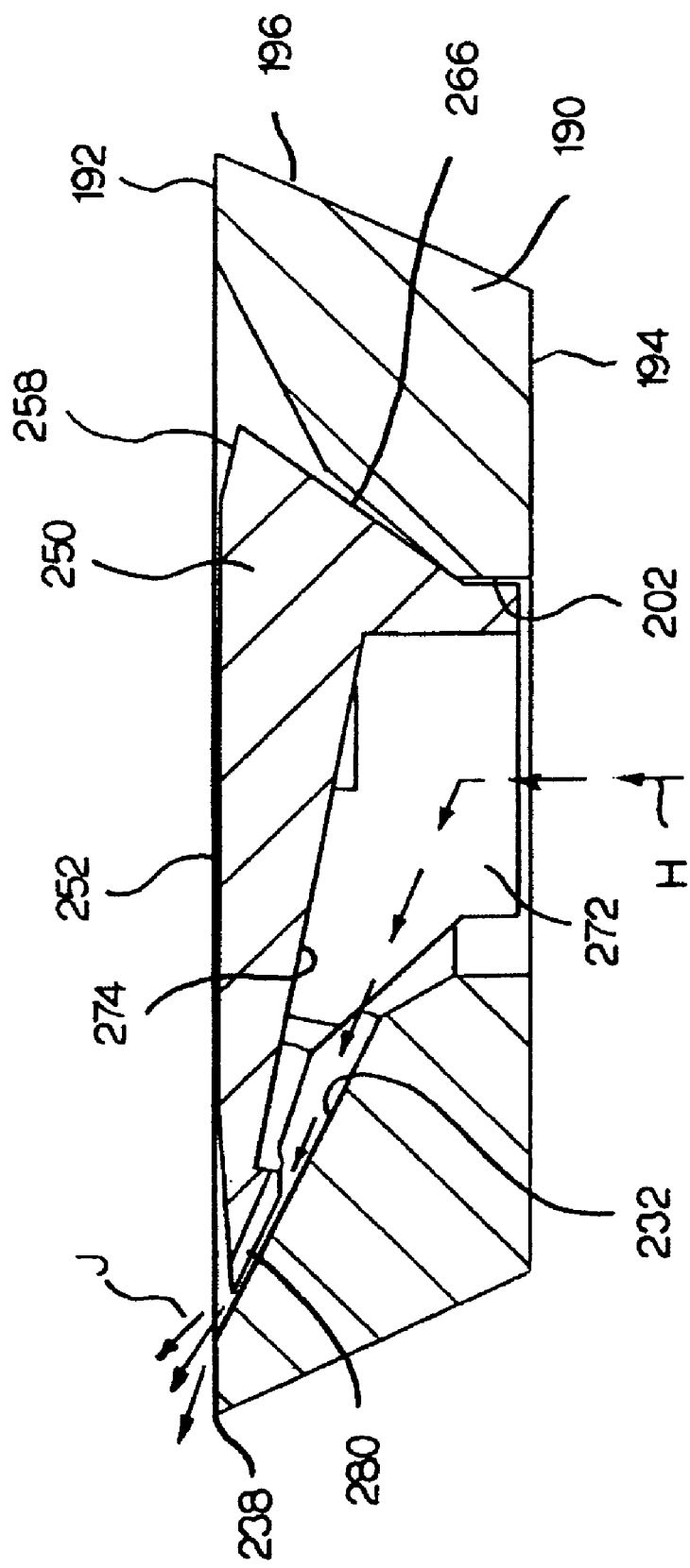
FIG. 16D is a cross-sectional view of an assembled milling insert and diverter member taken along a cross-section in generally the same orientation as that for like that of FIG. 14B showing the flow of coolant into the milling insert-diverter member assembly and the exit of the coolant below the cutting plane.

Referring to FIG. 16D, there is shown a cross-sectional view of the assembled milling insert 190 and diverter 250. One can see that the coolant flows (see arrow H) into the assembly by entering through the coolant entry passage 202 and into the receiving opening 272 of the diverter 250. Coolant continues to flow through the conduit defined between the coolant trough 274 and the discrete depression that correspond to the selected cutting edge. In this case, the cutting edge is cutting edge 238 which corresponds to discrete depression 232.

As shown by the arrows J, coolant that exits the milling insert-diverter assembly does so below a plane that is along the rake surface 192 of the milling insert 190 so that the coolant exits below the cutting plane. The coolant then sprays upwardly towards the cutting location as can bee seen by arrows J. By directing the coolant spray upwardly toward the cutting location, the coolant is able to impinge the location or vicinity of the insert-chip interface. This provides the advantages connected with the direction of the coolant spray upwardly toward the cutting location wherein these advantages include a reduction of the negative impact of the heat build-up at the milling insert-workpiece interface, an improvement in the lubrication at the milling insert-chip interface to avoid or reduce accumulation of workpiece material on the milling insert, and to facilitate the evacuation of the chips from the vicinity of the milling insert-chip interface to avoid re-cutting the chip.

In regard to the operation of the overall milling cutter assembly 40, the milling cutter assembly 40 rotates under the influence of a machine tool driver or the like to rotate in the counterclockwise direction (see arrow R) as viewed in FIG. 1. The central coolant reservoir 94 is in communication with a coolant source wherein the coolant source is typically under pressure during the rotational operation of the milling cutter assembly 40. As can be appreciated, the coolant flows through and out of the central longitudinal hexagonal bore 118 of the lock screw 106 and over the surface at the top end 108 and into the central coolant reservoir 94.

Coolant flows out of the central coolant reservoir 94 through the coolant passages 76 and travels through the coolant passages 76 to exit at the trailing inclined seating surface 74 of the seating section 60. It is at this point that the coolant enters into the milling insert assembly 150 as described hereinafter.

Coolant flows into the shim 170 through the elongate slot 184 and then into the central coolant bore 186. The flowing coolant passes from the central coolant bore 186 into the receiving opening 272 defined by the collar 270 of the diverter 250, which is located in the central cavity of the milling insert 190. The coolant then flows via the conduit defined between the radial trough 274 of the diverter 250 and the surface that defines the adjacent discrete depression. Flowing coolant exits the conduit at the flange 280 in such a fashion that coolant flows over both portions (282, 284) of the flange 280. Coolant then flows over the cutting edge to supply coolant to the vicinity of the insert-chip interface at the cutting location.

Figure 17:
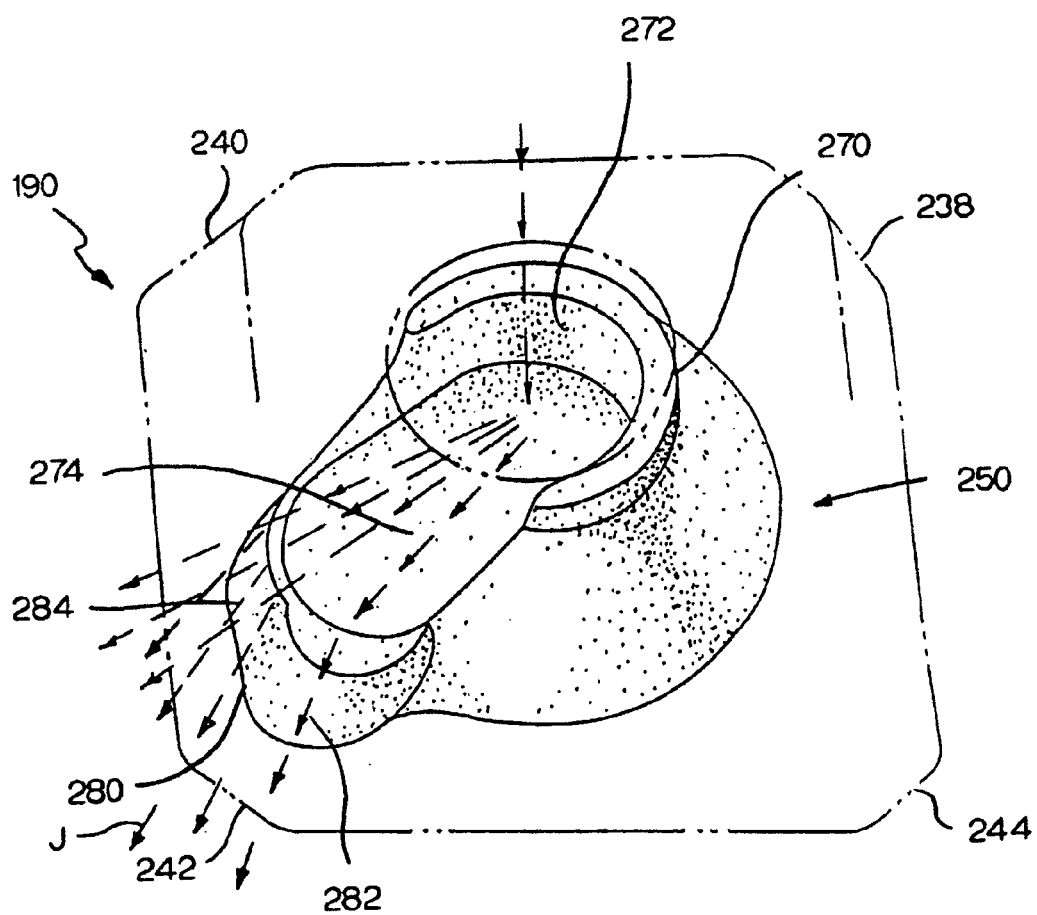
FIG. 17 is an isometric view of a left-handed version of the diverter member of FIG. 15 shown in conjunction with the milling insert (shown in phantom) wherein the diverter member is selectively positioned to direct the flow of coolant (shown by arrows) in the direction of a selected cutting edge positioned to be in engagement with a workpiece.

Referring to FIG. 17, the milling insert assembly 150 has the ability to selectively direct coolant to a selected cutting edge (e.g., cutter edge 242 shown in FIG. 17) that engages the workpiece. Selective direction of coolant is accomplished by rotating the diverter 250 to a selected position so as to correspond to the engaged cutting edge 242. As shown in FIG. 17, the diverter 250 is positioned so that the flange 280 is in alignment with cutting edge 242 of the milling insert 190. When in this position, the coolant will travel toward and exit underneath the cutting edge 242 as described hereinabove. Here, it should be noted that the flowing coolant passes over the smaller portion and the larger portion so that the coolant flow is directed to the engaged cutting edge 242.

As can be appreciated, there will come a point during the milling operation that the milling insert 190 will need to be indexed or repositioned to present a new cutting edge for engagement with the workpiece. In the case of the indexable milling insert, this means that the milling insert 190 will be rotated in the pocket 52 to present a new cutting edge (e.g., cutting edge 240). As an example and still referring to FIG. 17, once the cutting edge 242 has become worn or reached a condition that necessitates a change, the milling insert 190 would be indexed to present cutting edge 240 as the cutting edge in engagement with the workpiece. In order to provide coolant to the new cutting edge 240, the diverter 250 would be rotated about ninety degrees in the clockwise direction as viewed in FIG. 17. The coolant trough 274 would cooperate with the discrete depression corresponding to the cutting edge 240 to direct coolant to the engaged cutting edge.

As shown in FIG. 17, the coolant (as shown by arrows "J") exits at a location on the underneath side of the cutting edge at the interface of the cutting edge and the workpiece. As a result, the coolant provides for a reduction of the negative impact of the heat build-up at the milling insert-chip interface. As a further result, the presence of the coolant provides for an improvement in the lubrication at the milling insert-chip interface to avoid or reduce accumulation of workpiece material on the milling insert. In addition, the coolant stream facilitates the evacuation of the chips from the vicinity of the milling insert-chip interface to avoid re-cutting the chip.

Figure 18:
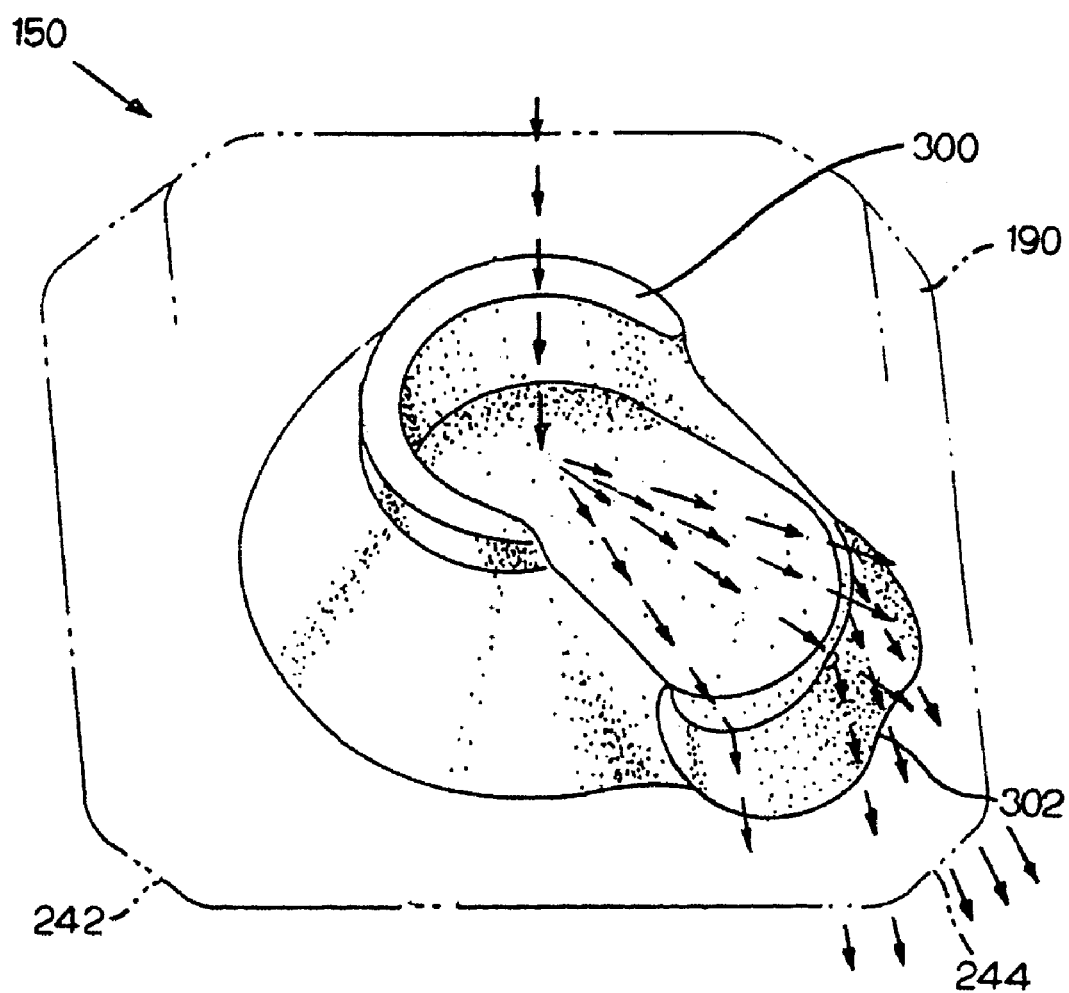
FIG. 18 is an isometric view of a right-handed version of the diverter member shown in conjunction with the milling insert (shown in phantom) wherein the diverter member is selectively positioned to direct the flow of coolant (shown by arrows) in the direction of a selected cutting edge positioned to be in engagement with a workpiece.

Referring to FIG. 18, there is illustrated another embodiment of the diverter 300 in connection with the milling insert 190. This embodiment of the diverter 300 is similar to the previous embodiment of the diverter 250, except that the handedness of the diverter 304 is different. In this regard, diverter 300 presents a right-handed diverter and diverter 250 presents a left-handed diverter.

Like with the embodiment shown in FIG. 17, the milling insert assembly 150 has the ability to selectively direct coolant to a selected cutting edge that engages the workpiece by rotating the diverter to a selected position relative to the engaged cutting edge. As shown in FIG. 18, the diverter 300 is positioned so that the flange 302 is in alignment with cutting edge 244 of the milling insert 190. When in this position, the coolant will travel toward and exit underneath the cutting edge 244 as described hereinabove. Prior to indexing the milling insert 190, the diverter 300 will be rotated so that the flange 302 is aligned toward the new cutting edge as described above in conjunction with diverter 250. It can thus be appreciated that the ability of the diverter 300 to be selectively positioned enhances the capability of the milling insert assembly to supply coolant to a newly selected cutting edge during the milling operation. When in this condition, the coolant will be supplied to underneath the new cutting edge.

Figure 19:
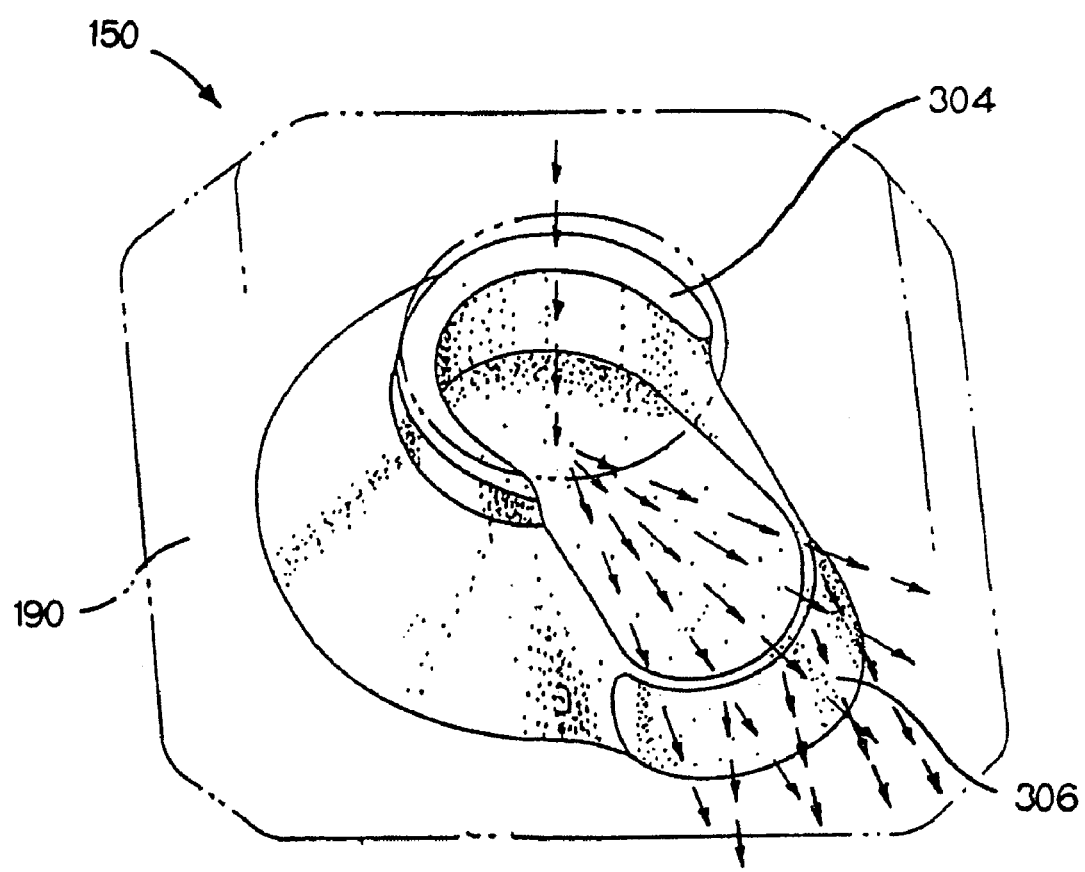
FIG. 19 is an isometric view of a bi-directional diverter member shown in conjunction with the milling insert (shown in phantom) wherein the diverter member is selectively positioned to direct the flow of coolant (shown by arrows) in the direction of a selected cutting edge positioned to be in engagement with a workpiece.

FIG. 19 illustrates still another specific embodiment of the diverter 304. The structure of this embodiment is along the lines of the diverter 250, except that the flange 306 does not have an extended portion. As a result, when the diverter 304 is attached to a milling insert, the flowing coolant exists over the entire surface of the flange and not in a directional fashion such as with diverter 250 and diverter 300.

Figure 20:
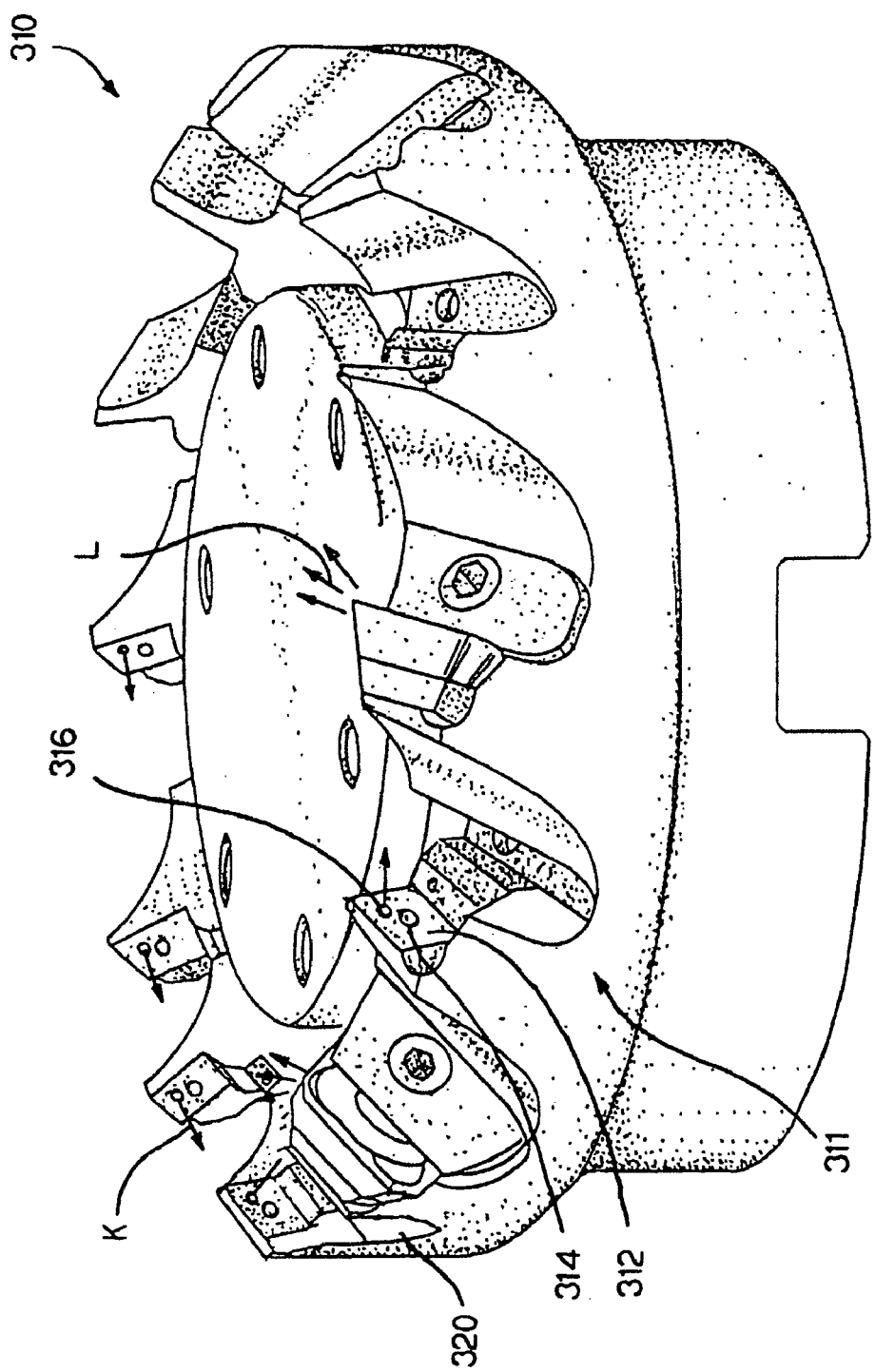
FIG. 20 is an isometric view of another specific embodiment of the milling cutter assembly of the invention wherein the milling cutter body presents pockets spaced about the circumference thereof, and wherein some of the pockets are shown being empty (i.e., without a milling insert assembly therein), and two of the pockets are show as containing a milling insert assembly with the flow of coolant shown by arrows.
Figure 21:
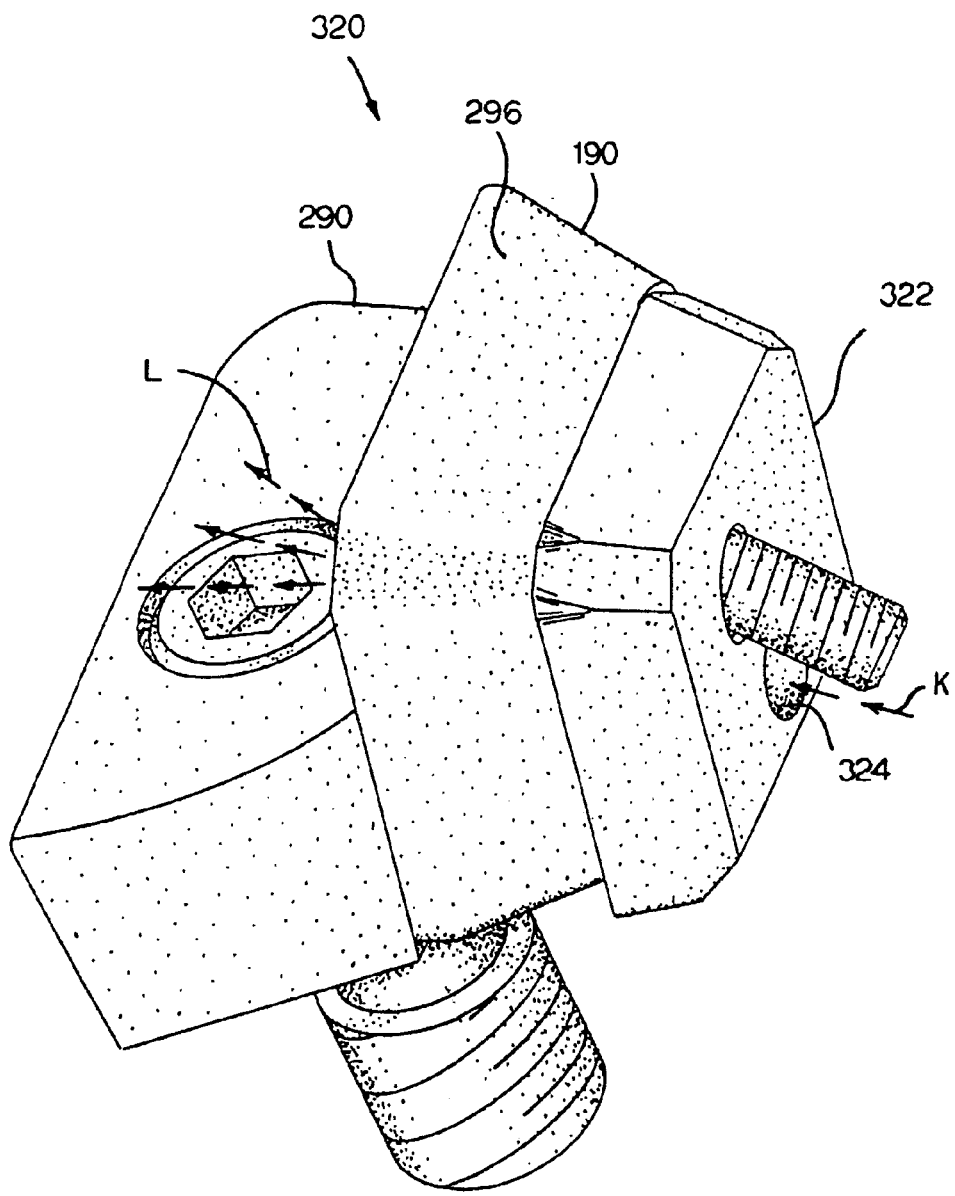
FIG. 21 is an isometric view of a milling insert assembly wherein the components are assembled together, and the flow of coolant is shown by arrows entering through a passage in the bottom surface of another specific embodiment of the shim and exiting the milling insert adjacent to the cutting edge that is in engagement with the workpiece.
Figure 22:
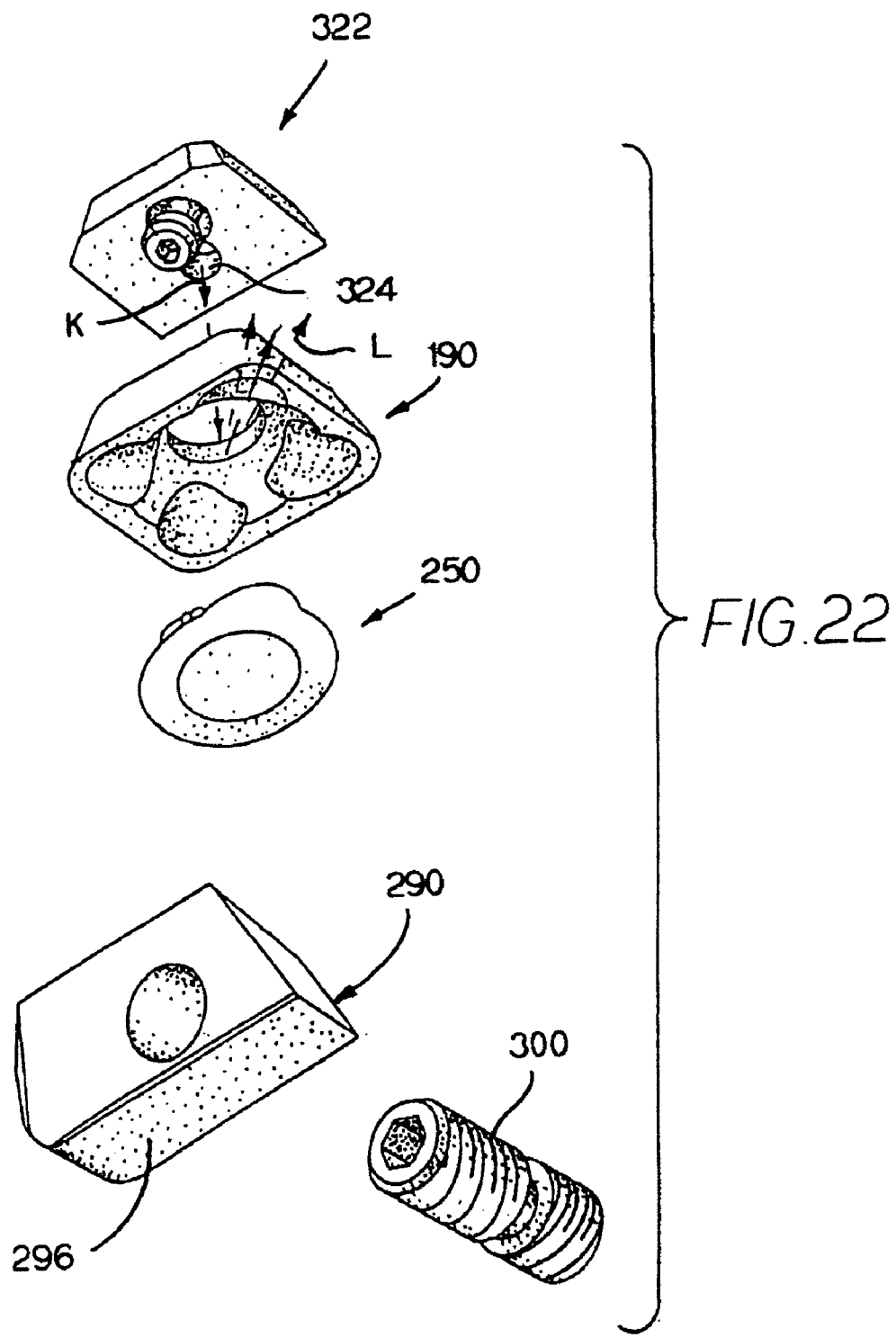
FIG. 22 is an isometric view of the milling insert assembly of FIG. 21 with the components exploded apart along a central axis.

FIGS. 20 through 22 illustrate a milling insert assembly 320 that includes a milling insert 190, diverter 250 and clamp 290 like those described above. However, the shim 322 is different in that it contains a central coolant hole 324 in the bottom surface without an elongate slot in the peripheral edge. As shown in FIG. 20, the pocket has a coolant passage 316 in the generally upstanding seating surface. Coolant exits coolant passage 316 as shown by arrow "K" in FIG. 20.

When the milling insert assembly is affixed in the pocket, the central coolant hole 324 is in alignment with the coolant passage 316. FIGS. 21 and 22 show the flow of coolant directly into the central coolant hole 324 and then into the milling insert-diverter assembly in a fashion as described above. The coolant then flows through the milling insert 190 in a fashion like that already described above. FIG. 20 shows the coolant exiting the milling insert as represented by arrows "L".

Figure 23:
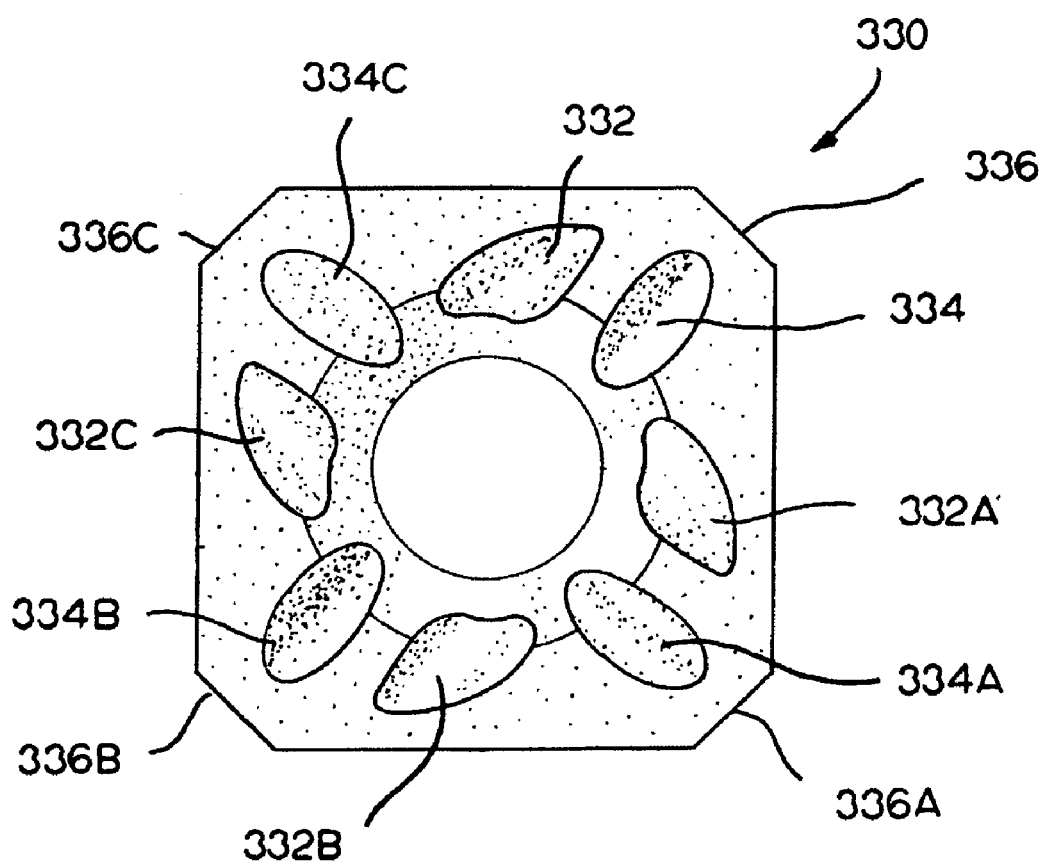
FIG. 23 is a top view of another specific embodiment of the milling insert wherein two discrete depressions correspond to each one of the cutting edges.

FIG. 23 illustrates another embodiment of the milling insert 330 in which two discrete depressions 332, 334 correspond to only one cutting edge (or cutting location) 336. In this regard, these discrete depressions present a geometry that is somewhat different from that of the discrete depressions in milling insert 190. Even though the geometry is different from that of milling insert 190, discrete depressions (332, 334) in milling insert 330 still function to facilitate the efficient delivery of flowing coolant toward the cutting edge 336 whereby the coolant flowing in the discrete depression in the radial outward direction converges toward a radial outer portion of the discrete depression. Referring to the other cutting edges of the milling insert 330, two discrete depressions 332A, 334A correspond to cutting edge (or cutting location) 336A, two discrete depressions 332B, 334B correspond to cutting edge (or cutting location) 336B, two discrete depressions 332C, 334CA correspond to cutting edge (or cutting location) 336C.

It should be appreciated that the discrete depressions (332, 334) are sufficiently narrow to permit that coolant trough of the corresponding diverter to encompass both discrete depressions. By doing so, both discrete depressions (332, 334) and coolant trough form a conduit that is fluidly isolated due to the formation of a fluid-tight seal between the diverter and the milling insert when assembled together as is the case with the milling insert (190)-diverter (250) assembly.

Tests have been performed to demonstrate the performance of a specific embodiment of the milling cutter assembly. In this regard, a 100 millimeter diameter milling cutter made according to the specific embodiment of FIG. 1 was used to mill an annealed block of Ti-6AL-4V titanium alloy that was 7.62 centimeters wide and 25.4 centimeters long. The test milling was conducted by straddle milling with the center of the milling cutter assembly aligned with the center of the workpiece. The metalcutting conditions are set forth in Table 1 below.

TABLE 1

Metalcutting Conditions for Test Milling of a Ti—6Al—4V Workpiece (7.62 cm × 25.4 cm) via a 100 mm Diameter Milling Cutter

| Parameter | Value |
| --- | --- |
| Speed | 57.15 meters per second |
| Feed | 0.267 mm/revolution |
| DOC (depth of cut) | 2.0 mm |
| Insert Style | SEAN53AFNCOOL |
| Grade of Cutting Insert | K322 |

TABLE 1-continued

Metalcutting Conditions for Test Milling of a Ti—6Al—4V Workpiece (7.62 cm × 25.4 cm) via a 100 mm Diameter Milling Cutter

| Parameter | Value |
| --- | --- |
| Edge Preparation | 0.0635 mm radius |
| Coolant | Coolant at a 12% concentration |

The Kennametal grade K322 is a tungsten carbide-cobalt milling grade that contains about 9.75 weight percent cobalt and the balance tungsten carbide having a grain size ranging between 1-6 microns along with recognized impurities. The K322 grade has a nominal hardness equal to about 90.8 on the Rockwell A scale, and a magnetic saturation value equal to between about 180 and about 220 Oersteds.

For comparison purposes, tests were conducted using the following coolant delivery conditions: flood coolant wherein coolant engulfed the milling insert and the workpiece, coolant delivered through the spindle, and coolant delivered through the milling insert per the above invention. Referring to Table 2 below, which presents the test results, the pressure was determined from a pump gauge and the flow rate was measured by filling a five gallon bucket for thirty seconds and then weighing the contents.

TABLE 2

Test Results for Three Coolant Delivery Methods

| Coolant Delivery | Pressure (bar) | Flow (liters per minute) | Tool Life Passes | Tool Life (cubic cm) | Time (minutes) |
| --- | --- | --- | --- | --- | --- |
| Flood | 17.2 | 16.7 | 1.2 | 51.14 | 6.1 |
| Conventional Through spindle | 13.8 | 30.0 | 2.7 | 115.06 | 13.7 |
| Through the Insert (invention) | 22.4 | 14.2 | 4.8 | 204.55 | 24.4 |

In regard to the tool life criteria, optical images were taken at 30× (magnification) after each pass across the block to determine the tool wear. The end of the tool life was determined when the wear exceeded 0.38 millimeters on the any one of the nose, the flank or the rake faces. As can be seen from Table 2, the tool life was reported in the number of passes until the wear limit was reached, the tool life was reported in the volume of material (cubic centimeters) removed from the workpiece until the wear limit was reached, and the time that it took to teach the wear limit. The results in Table 2 show that in the case of milling the Ti-6Al-4V alloy, the inventive milling insert exhibited a tool life that was about four times are great when compared to using a conventional flood coolant method and that was about 2.2 times as great when compared to using a conventional through the spindle method to deliver coolant.

The milling cutter assembly 30 has a number of advantages because it provides coolant to the underneath side of the cutting edge at the interface of the cutting edge and the workpiece. As a result, the coolant provides for a reduction of the negative impact of the heat build-up at the milling insert-workpiece interface. As a further result, the presence of the coolant provides for an improvement in the lubrication at the milling insert-chip interface to avoid or reduce accumulation of workpiece material on the milling insert. In addition, the coolant stream facilitates the evacuation of the chips from the vicinity of the milling insert-chip interface to avoid re-cutting the chip.

It is apparent that the present invention provides a milling cutter, as well as a milling insert, used for chipforming and material removal operations wherein there is an improved delivery of coolant to the interface between the milling insert and the workpiece. A number of advantages exist as a result of the improvement in the coolant delivery.

In this regard, the present invention provides a milling cutter, as well as a milling insert, used for chipforming and material removal operations wherein there is an improved delivery of coolant to the interface between the milling insert and the workpiece (i.e., the location on the workpiece where the chip is generated). As a result, the coolant provides for a reduction of the negative impact of the heat build-up at the milling insert-workpiece interface. As a further result, the presence of the coolant provides for an improvement in the lubrication at the milling insert-chip interface to avoid or reduce accumulation of workpiece material on the milling insert. In addition, the coolant stream facilitates the evacuation of the chips from the vicinity of the milling insert-chip interface to avoid re-cutting the chip.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting insert for use in chipforming and material removal and wherein coolant is supplied to the cutting insert, the cutting insert comprising:
   a cutting insert body presenting at least one cutting location;
   the cutting insert body containing a coolant entry passage through which coolant can flow; and
   the cutting insert body having a rake surface, the rake surface containing at least one discrete depression in communication with the coolant entry passageway, the discrete depression corresponding to the cutting location, and the discrete depression extending toward the corresponding cutting location in the radial outward direction, the discrete depression having a depth relative to the rake surface, and the depth decreasing in the radial outward direction.

2. The cutting insert according to claim 1 wherein the cutting insert body presenting at least two of the cutting locations, and the rake surface containing at least two of the discrete depressions, each one of the discrete depressions corresponding to one of the cutting locations, and each one of the discrete depressions extending toward its corresponding cutting location.

3. The cutting insert according to claim 1 wherein the cutting insert body presenting at least two of the cutting locations, and the discrete depression corresponding to and extending toward one of the cutting locations.

4. The cutting insert according to claim 1 wherein the cutting insert body presenting a plurality of the cutting locations, and the rake surface containing a plurality of the discrete depressions, each one of the discrete depressions corresponding to one of the cutting locations, and each one of the discrete depressions extending toward its corresponding cutting location.

5. The cutting insert according to claim 1 wherein the discrete depression having a radial outward termination adjacent to the cutting location whereby coolant exits the discrete depression below the cutting location and sprays upward toward the cutting location.

6. The cutting insert according to claim 1 wherein the cutting insert body further including a bottom surface, and a peripheral flank surface; the cutting insert body having an indention in the rake surface surrounding the coolant entry passage; and each one of the discrete depressions intersecting the indention so as to be in communication with the coolant entry passage.

7. The cutting insert according to claim 6 wherein each one of the discrete depressions having a radial inner portion and a radial outer portion, and the radial inner portion intersecting the indention and the radial outer portion being adjacent to the corresponding one of the cutting locations.

8. The cutting insert according to claim 7 wherein the radial outer portion of each one of the discrete depressions terminating at a location radial inward of the corresponding one of the cutting locations; and for each one of the discrete depressions, a peripheral portion of the rake surface separates the radial outer portion of the discrete depression from the corresponding one of the cutting locations.

9. A cutting insert for use in chipforming and material removal and wherein coolant is supplied to the cutting insert, the cutting insert comprising:
   a cutting insert body presenting at least one cutting location;
   the cutting insert body containing a coolant entry passage through which coolant can flow;
   the cutting insert body having a rake surface, the rake surface containing at least one discrete depression in communication with the coolant entry passageway, the discrete depression corresponding to the cutting location, and the discrete depression extending toward the corresponding cutting location;
   the cutting insert body further including a bottom surface, and a peripheral flank surface;
   the cutting insert body having an indention in the rake surface surrounding the coolant entry passage; and each one of the discrete depressions intersecting the indention so as to be in communication with the coolant entry passage; and
   wherein each one of the discrete depressions having a depth relative to the rake surface, and the depth decreasing in the radial outward direction.

10. The cutting insert according to claim 9 wherein each one of the discrete depressions having a width coplanar with the rake surface, and the width decreasing in the radial outward direction whereby coolant flowing in the discrete depression in the radial outward direction converges toward a radial outer portion of the discrete depression.

11. The cutting insert according to claim 6 wherein each one of the cutting locations comprises a discrete cutting edge formed at the intersection of the rake surface and the peripheral flank surface.

12. The cutting insert according to claim 1 wherein each one of the discrete depressions having a volume, and the volume of each depression decreasing in a radial outward direction.

13. The cutting insert according to claim 1 wherein the cutting insert body is made by a powder metallurgical technique, and wherein the cutting insert body comprises one of the materials selected from the group consisting of tool steels, cemented carbides, cermets and ceramics.

14. The cutting insert according to claim 1 wherein the cutting insert body is coated with one or more coating layers.

15. The cutting insert according to claim 1 wherein at least two of the discrete depressions corresponds to the same one of the cutting locations.

16. A cutting insert assembly for use in chipforming and material removal and the cutting insert assembly being received in a pocket of a cutter body wherein coolant can flow out of a pocket opening contained in the pocket, the cutting insert assembly comprising:
a cutting insert body presenting at least two discrete cutting locations;
the cutting insert body containing a coolant entry passage aligned with the pocket opening for coolant to flow through the coolant entry passage; and
the cutting insert body having a rake surface containing at least two of the discrete depressions, each one of the discrete depressions corresponding to one of the cutting locations, and each one of the discrete depressions extending toward its corresponding cutting location;
a diverter being positioned adjacent to the cutting insert body;
the diverter having a receiving opening aligned with the coolant entry passage to receive coolant through the coolant entry passage; and
the diverter including a coolant trough in communication with the receiving opening, and the coolant trough being aligned toward a selected one of the cutting locations whereby the coolant trough and the discrete depression corresponding to the selected cutting location define a conduit for the flow of coolant toward the selected cutting location.

17. The cutting insert assembly according to claim 16 wherein each one of the discrete depressions having a radial outward termination adjacent to the corresponding cutting location whereby coolant exits the conduit below the selected cutting location and sprays upward toward the selected cutting location.

18. The cutting insert assembly according to claim 16 wherein the cutting insert body including a rake surface, a bottom surface, and a peripheral flank surface; the cutting insert body having an indention in the rake surface surrounding the coolant entry passage; and each one of the discrete depressions intersecting the indention so as to be in communication with the coolant entry passage.

19. The cutting insert assembly according to claim 18 wherein each one of the discrete depressions having a radial inner portion and a radial outer portion, and the radial inner portion intersecting the indention and the radial outer portion being adjacent to the corresponding one of the cutting locations.

20. The cutting insert assembly according to claim 19 wherein the radial outer portion of each one of the discrete depressions terminating at a location radial inward of the corresponding one of the cutting locations; and for each one of the discrete depressions, a peripheral portion of the rake surface separates the radial outer portion of the discrete depression from the corresponding one of the cutting locations.

21. The cutting insert assembly according to claim 20 wherein the coolant that exits the conduit can flow over the peripheral portion of the rake surface adjacent to the selected cutting location.

22. The cutting insert assembly according to claim 18 wherein each one of the cutting locations comprises a discrete cutting edge formed at the intersection of the rake surface and the peripheral flank surface.

23. The cutting insert assembly according to claim 16 wherein the conduit being substantially fluidly isolated.

24. The cutting insert assembly according to claim 23 wherein the diverter having a central diverter body containing the receiving opening and the coolant trough, and at least a portion of the central diverter body contacting a portion of a surface defining the discrete depression corresponding to the selected one of the cutting locations to form a substantially fluid-tight seal there at.

25. The cutter insert assembly according to claim 16 wherein each one of the depressions having a volume, and the volume of each discrete depression decreasing in a radial outward direction.

26. The cutting insert assembly according to claim 16 wherein the conduit having a volume, and the volume of the conduit decreasing in a radial outward direction.

27. The cutting insert assembly according to claim 16 further including a shim, and the shim containing an internal coolant passageway providing communication between the coolant entry passage of the cutting insert body and the coolant exiting the pocket opening in the pocket of the cutter body.

28. The cutting insert assembly according to claim 27 wherein the shim having a corner corresponding to the selected cutting location; and the shim further containing a radial coolant passageway in communication with the internal coolant passageway for the coolant to flow through the radial coolant passageway toward the selected cutting location.

29. The cutting insert assembly according to claim 27 wherein the internal coolant passageway opens in a peripheral flank surface of the shim whereby the internal coolant passageway is in alignment with the pocket opening in the pocket of the cutter body.

30. The cutting insert assembly according to claim 27 wherein the internal coolant passageway opens in a top surface of the shim whereby the internal coolant passageway is in alignment with the pocket opening in the pocket of the cutter body.

31. The cutting insert assembly according to claim 16 wherein the diverter has a distal tapered flange, and each one of the discrete depressions having a radial inner portion and a radial outer portion, and the tapered flange being adjacent to the radial outer portion of the discrete depression corresponding to the selected one of the cutting locations.

32. The cutting insert assembly according to claim 16 wherein the cutting insert body is made via a powder metallurgical technique; and the cutting insert body comprises one of the materials selected from the group consisting of tool steels, cemented carbides, cermets and ceramics.

33. The cutting insert according to claim 16 wherein at least one of the discrete depressions corresponds to the same one of the cutting locations.

34. A diverter for use in conjunction with a cutting insert, the diverter comprising:
a central diverter body containing a receiving opening that receives coolant from the cutting insert;
the central diverter body further containing a coolant trough in communication with the receiving opening, and the coolant trough extending in a radial outward direction from the receiving opening; and
the coolant trough having a distal tapered flange.

35. The diverter according to claim 34 wherein the distal tapered flange having at least two portions wherein one of the portion extends a greater distance in the radial outward direction than another of the portions of the distal tapered flange.

36. The diverter according to claim 34 wherein the central diverter body having a collar that defines the receiving opening.

37. The diverter according to claim 36 wherein the central diverter body having a frusto-conical portion surrounding the collar.

38. A milling cutter assembly for use in chipforming and material removal wherein coolant is supplied to the milling cutter from a coolant source, the milling cutter comprising:
  a milling cutter body containing a coolant reservoir in communication with a coolant source, the milling cutter body further containing a pocket having a pocket opening in communication with the coolant reservoir, and
  a cutting insert body presenting at least two discrete cutting locations;
  the cutting insert body containing a coolant entry passage aligned with the pocket opening for coolant to flow through the coolant entry passage;
  the cutting insert body having a rake surface containing at least two of the discrete depressions, each one of the discrete depressions corresponding to one of the cutting locations, and each one of the discrete depressions extending toward its corresponding cutting location;
  a diverter being positioned adjacent to the cutting insert body;
  the diverter having a receiving opening aligned with the coolant entry passage to receive coolant through the coolant entry passage;
  the diverter including a coolant trough in communication with the receiving opening, and the coolant trough being aligned toward a selected one of the cutting locations whereby the coolant trough and the discrete depression corresponding to one of the selected cutting locations define a conduit for the coolant to flow toward the selected cutting location.

39. The milling cutter assembly according to claim 38 wherein the milling cutter body containing a coolant passageway that provides communication between the coolant reservoir and the pocket opening.

40. The milling cutter assembly according to claim 38 wherein the milling cutter body containing a plurality of coolant passageways providing communication between the coolant source and the coolant reservoir.

* * * * *